(12) United States Patent
Kojima et al.

(10) Patent No.: US 7,142,354 B2
(45) Date of Patent: Nov. 28, 2006

(54) WAVELENGTH CONVERSION METHOD, WAVELENGTH CONVERSION DEVICE, AND LASER BEAM MACHINE

(75) Inventors: Tetsuo Kojima, Tokyo (JP); Susumu Konno, Tokyo (JP); Shuichi Fujikawa, Tokyo (JP); Koji Yasui, Tokyo (JP); Takatomo Sasaki, Suita (JP); Yusuke Mori, Katano (JP); Masashi Yoshimura, Ikeda (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 56 days.

(21) Appl. No.: 10/511,170

(22) PCT Filed: Dec. 12, 2001

(86) PCT No.: PCT/JP01/10905

§ 371 (c)(1),
(2), (4) Date: Oct. 14, 2004

(87) PCT Pub. No.: WO02/48786

PCT Pub. Date: Jun. 20, 2002

(65) Prior Publication Data

US 2005/0225837 A1   Oct. 13, 2005

Related U.S. Application Data

(63) Continuation of application No. PCT/JP01/07585, filed on Sep. 3, 2001.

(30) Foreign Application Priority Data

Dec. 14, 2000 (JP) .............................. 2000-379925
Sep. 3, 2001 (WO) ....................... PCT/JP01/07585

(51) Int. Cl.
*G02F 1/35* (2006.01)
*H01S 3/108* (2006.01)

(52) U.S. Cl. ........................................ 359/326; 372/21

(58) Field of Classification Search ........ 359/326–332; 372/21–22
See application file for complete search history.

(56) References Cited

U.S. PATENT DOCUMENTS 4,330,721 A * 5/1982 Hauck et al. ............... 359/328
5,093,882 A * 3/1992 Asano et al. ............... 385/122

(Continued)

FOREIGN PATENT DOCUMENTS

EP   1 048 974   11/2000

(Continued)

OTHER PUBLICATIONS

Yap et al., "Alleviation of thermally induced phase mismatch in $CsLiB_6O_{10}$ crystal by means of temperature-profile compensation", Optics Letters, vol. 23, No. 13, Jul. 1, 1998, pp. 1016-1018.

*Primary Examiner*—John D. Lee
(74) *Attorney, Agent, or Firm*—Leydig, Voit & Mayer, Ltd.

(57) ABSTRACT

In a wavelength converting method, an ambient that is in contact with a surface of a non-linear optical crystal from which wavelength-converted light is outputted is a gas that is lower in content of nitrogen than air. A wavelength converting device includes a device for controlling the ambient in contact with a surface of the non-linear optical crystal from which the wavelength-converted light is outputted so the ambient is lower in nitrogen than air. A laser machining device includes the wavelength converting device.

20 Claims, 12 Drawing Sheets

U.S. PATENT DOCUMENTS

| | | |
|---|---|---|
| 5,862,163 A | 1/1999 | Umezu et al. |
| 6,002,697 A | 12/1999 | Govorkov et al. |
| 6,381,255 B1 | 4/2002 | Van Saarloos et al. |
| 6,404,786 B1 | 6/2002 | Kondo et al. |
| 6,532,100 B1 * | 3/2003 | Partanen et al. ............ 359/326 |
| 6,667,828 B1 * | 12/2003 | Shull .......................... 359/333 |

FOREIGN PATENT DOCUMENTS

| | | |
|---|---|---|
| JP | 11-119272 | 4/1999 |
| JP | 11-167132 | 6/1999 |
| JP | 11-271820 | 10/1999 |
| JP | 11-288012 | 10/1999 |
| JP | 20001-51311 | 2/2001 |

* cited by examiner

WAVELENGTH CONVERSION METHOD, WAVELENGTH CONVERSION DEVICE, AND LASER BEAM MACHINE

TECHNICAL FIELD

The present invention relates to a wavelength converting technique using a non-linear optical crystal.

BACKGROUND ART

FIG. 12 is a cross-sectional view showing a conventional wavelength converting device which is disclosed in, for example, JP 11-271820 A. In FIG. 12, reference numeral 1 denotes a vacuum vessel; 2 denotes a non-linear optical crystal such as cesium/lithium/borate (chemical expression: $CsLiB_6O_{10}$ (CLBO)); 3a and 3b denote optical windows; 4a, 4b and 4c denote O-rings; 5 denotes a vacuum sealing valve; and 6 denotes a fixing fitting. Reference numeral 7 denotes an entire wavelength converting device.

Subsequently, the operation will be described. A laser beam enters the inside of the vacuum vessel 1 from the optical window 3a at an input side, and interacts with the non-linear optical crystal 2 so as to be subjected to wavelength conversion. Thereafter, the laser beam is outputted from the optical window 3b at an output side. A top portion of the vacuum vessel 1 is disposed with the vacuum sealing valve 5, and the boundaries between the main body of the vacuum vessel 1 and the optical windows 3a, 3b and vacuum sealing valve 5 are sealed with the O-rings 4a, 4b and 4c, and the interior of the vacuum vessel 1 is maintained in vacuum.

In the interior of the vacuum vessel 1, the non-linear optical crystal 2 is pushed by the fixing fitting 6 from the upper so as to be fixed onto a bottom portion of the vacuum vessel 1.

As described above, since the conventional wavelength converting device maintains the atmosphere around the wavelength conversion crystal in vacuum, impurities are liable to occur from the vacuum vessel, the O-rings, the fixing fitting and so on which are exposed to vacuum, and the impurities are stuck onto the non-linear optical crystal 2 (wavelength conversion crystal) and the optical windows, resulting in such problems that a wavelength conversion laser beam (that is, a light that has been wavelength-converted by the non-linear optical crystal) cannot be generated stably for a long period of time, and the vacuum vessel is required for a vessel and the device is expensive.

The present invention has been made in order to solve the above-mentioned problems, and therefore an object of the present invention is to provide a wavelength converting method and a wavelength converting device, and a wavelength conversion laser device and a laser machining device using the wavelength converting method and device which realize generating a light that has been wavelength-converted by the non-linear optical crystal stably for a long period of time.

DISCLOSURE OF THE INVENTION

A wavelength converting method according to the present invention is directed to a wavelength converting method that wavelength-converts a light through a non-linear optical crystal, in which an atmosphere that is in contact with an outgoing end surface of the non-linear optical crystal from which the light that has been wavelength-converted is outputted is a gas that is smaller in content of nitrogen elements than air, and the wavelength conversion is conducted in the atmosphere.

According to this method, there can be obtained such an advantage that the light that has been wavelength-converted by the non-linear optical crystal can be generated stably for a long period.

Also, in a wavelength converting method according to the present invention, an incident end surface of the non-linear optical crystal to which the light to be wavelength-converted is inputted and the outgoing end surface of the non-linear optical crystal from which the wavelength-converted light is outputted are surrounded by a gas that is smaller in the content of nitrogen elements than air, and the wavelength conversion is conducted in the gas.

According to this method, there can be obtained such an advantage that the light that has been wavelength-converted by the non-linear optical crystal can be generated stably for a long period more surely.

Further, in a wavelength converting method according to the present invention, an atmosphere that is in contact with the incident end surface of the non-linear optical crystal to which the light to be wavelength-converted is inputted and an atmosphere that is in contact with the outgoing end surface of the non-linear optical crystal from which the wavelength-converted light is outputted are gases that contain different components, respectively, and the wavelength conversion is conducted in the gases.

According to this method, there can be obtained such an advantage that an interaction of the non-linear optical crystal with the atmosphere which is caused by the light that is wavelength-converted, and an interaction of the non-linear optical crystal with the atmosphere which is caused by the light that has been wavelength-converted can be prevented with a high efficiency, individually.

Still further, in a wavelength converting method according to the present invention, the gas that is smaller in the content of nitrogen elements than air is circulated.

According to this method, even if impurities occur, since the impurities are exhausted together with the circulating gas, the impurities can be prevented from being stuck onto the non-linear optical crystal or the optical windows.

Yet still further, in a wavelength converting method according to the present invention, after the gas that is smaller in the content of nitrogen elements than air is supplied to the vicinity of at least the outgoing end surface of the non-linear optical crystal, the gas is exhausted.

According to this method, there can be obtained such an advantage that even if impurities occur, since a flesh gas is supplied to the vicinity of the non-linear optical crystal, the impurities can be more surely prevented from being stuck onto the non-linear optical crystal.

Yet still further, in a wavelength converting method according to the present invention, the gas that is smaller in the content of nitrogen elements than air is a gas that is 10% or less in volume content of the gas containing nitrogen elements therein.

According to this method, there can be obtained such an advantage that the light that has been wavelength-converted by the non-linear optical crystal can be generated stably for a long period with a simple structure.

Yet still further, in a wavelength converting method according to the present invention, the non-linear optical crystal is a crystal including cesium.

According to this method, there can be obtained such an advantage that a high output light of an ultraviolet region which has been wavelength-converted by the non-linear optical crystal can be generated stably for a long period.

Yet still further, in a wavelength converting method according to the present invention, the gas is a gas that mainly contains any one of a rare gas, an oxygen gas and a carbon dioxide gas.

According to this method, there can be obtained such an advantage that the light which has been wavelength-converted by the non-linear optical crystal can be generated stably for a long period with a simpler structure.

Yet still further, in a wavelength converting method according to the present invention, the gas which is an atmosphere that is in contact with a surface of the non-linear optical crystal from which the wavelength-converted light is outputted and smaller in the content of nitrogen elements than air is a gas that mainly contains argon gas therein.

According to this method, there can be obtained such an advantage that the light which has been wavelength-converted by the non-linear optical crystal can be generated stably for a long period more surely.

According to the present invention, there is provided a wavelength converting device that wavelength-converts a light through a non-linear optical crystal, including a means for setting an atmosphere that is in contact with a surface of the non-linear optical crystal from which the light that has been wavelength-converted is outputted to a gas that is smaller in content of nitrogen elements than air.

According to this device, there can be obtained such an advantage that the light that has been wavelength-converted by the non-linear optical crystal can be generated stably for a long period.

Yet still further, in a wavelength converting device according to the present invention, the wavelength-converted light that is 5 W or higher in mean power is outputted.

According to this device, there can be obtained such an advantage that the high-output light which has been wavelength-converted by the non-linear optical crystal can be generated stably for a long period.

Also, a wavelength converting device according to the present invention further includes a means for surrounding an incident end surface of the non-linear optical crystal by a gas that is smaller in the content of nitrogen elements than air.

According to this device, there can be obtained such an advantage that the light that has been wavelength-converted by the non-linear optical crystal can be generated stably for a long period more surely.

Further, a wavelength converting device according to the present invention further includes a means for setting an atmosphere that is in contact with the surface of the non-linear optical crystal to which the light to be wavelength-converted is inputted and an atmosphere that is in contact with the surface of the non-linear optical crystal from which the wavelength-converted light is outputted to gases that contain different components, respectively.

According to this device, there can be obtained such an advantage that an interaction of the non-linear optical crystal with the atmosphere which is caused by the light that is wavelength-converted, and an interaction of the non-linear optical crystal with the atmosphere which is caused by the light that has been wavelength-converted can be prevented with a high efficiency, individually.

Still further, a wavelength converting device according to the present invention further includes a means for allowing the gas that is smaller in the content of nitrogen elements than air to be circulated.

According to this device, there can be obtained such an advantage that even if impurities occur, since the impurities are exhausted together with the circulating gas, the impurities can be prevented from being stuck onto the non-linear optical crystal or the optical windows.

Yet still further, in a wavelength converting device according to the present invention, a non-linear optical crystal is disposed within a vessel in which a window or an opening that allows an incident light or an outgoing light to pass therethrough is partially disposed, and there are provided a means for supplying a gas which is smaller in the content of nitrogen elements than air to the vicinity of at least the outgoing end surface of the non-linear optical crystal within the vessel, and a means for exhausting the supplied gas from the vessel.

According to this device, there can be obtained such an advantage that even if impurities occur, since a flesh gas is supplied to the vicinity of the non-linear optical crystal, the impurities can be more surely prevented from being stuck onto the non-linear optical crystal.

Yet still further, in a wavelength converting device according to the present invention, the gas that is smaller in the content of nitrogen elements than air is a gas that is 10% or less in the volume content of the gas containing nitrogen elements therein.

According to this device, there can be obtained such an advantage that the light that has been wavelength-converted by the non-linear optical crystal can be generated stably for a long period with a simple structure.

Yet still further, in a wavelength converting device according to the present invention, the non-linear optical crystal is a crystal including cesium.

According to this device, there can be obtained such an advantage that a high output light of an ultraviolet region which has been wavelength-converted by the non-linear optical crystal can be generated stably for a long period.

Yet still further, in a wavelength converting device according to the present invention, the gas that is smaller in the content of nitrogen elements than air is a gas that mainly contains any one of a rare gas, an oxygen gas and a carbon dioxide gas.

According to this device, there can be obtained such an advantage that the light which has been wavelength-converted by the non-linear optical crystal can be generated stably for a long period with a simpler structure.

Yet still further, in a wavelength converting device according to the present invention, the gas which is an atmosphere that is in contact with a surface of the non-linear optical crystal from which the light is outputted and smaller in the content of nitrogen elements than air is a gas that mainly contains argon gas therein.

According to this device, there can be obtained such an advantage that the light which has been wavelength-converted by the non-linear optical crystal can be generated stably for a long period more surely.

According to the present invention, there is provided a laser machining device, including a machining device, a laser device which is a light source for wavelength conversion as a machining light source and a means for setting an atmosphere which is in contact with a surface of a non-linear optical crystal from which a wavelength-converted light is outputted to a gas which is smaller in the content of nitrogen elements than air, and a wavelength converting device that wavelength-converts a laser beam from the laser device through the non-linear optical crystal.

According to this device, there can be obtained such an advantage that uniform machining can be conducted with high precision and stably for a long period.

BEST MODE FOR CARRYING OUT THE INVENTION

In order to investigate the deterioration cause of a wavelength conversion characteristic using a CLBO crystal, the present inventors continuously conducted for 100 hours the generation of an ultraviolet laser beam of a wavelength of 266 nm which is a fourth higher harmonic wave of Nd: YAG laser by using the CLBO crystal with a laser device that generates a second higher harmonic wave of a neodymium/YAG (Nd:YAG) laser which is 1064 nm in wavelength, that is, a laser beam which is 532 nm in wavelength as a light source. When the continuous ultraviolet laser beam is generated, the CLBO crystal is disposed on a heater in air and used at a constant temperature of 140° C. Also, the mean power of the generated ultraviolet laser beam which is 266 nm in wavelength is 20 W.

A newly stuck material was observed on an ultraviolet laser beam outgoing end surface of the CLBO crystal, that is, a surface of the CLBO crystal from which the light that has been wavelength-converted is outputted after a test of a 100-hour continuous ultraviolet laser beam generation. As a result of analyzing the element and the structure of the material, it has been proved that the stuck material is nitric acid compound containing cesium nitrate ($CsNO_3$). Since the cesium nitrate is observed on only the ultraviolet laser beam outgoing end surface of the CLBO crystal, and cesium is an element which is not contained in parts other than the CLBO crystal used for wavelength conversion, it is apparent that cesium which is a component of the CLBO crystal and nitrogen in the atmosphere react with each other due to the action of the ultraviolet laser beam which is 266 nm in wavelength and generated by wavelength conversion to generate cesium nitrate. Also, the generation of cesium nitrate by wavelength conversion using the CLBO crystal is a phenomenon which becomes first apparent through the long-period continuous ultraviolet laser beam generation test of the mean power with 5 W or higher which has been conducted by the present inventors. Up to now, this phenomenon was not apparent because a test other than the long-period operation test of an output with 4 W or less has not been conducted as disclosed in, for example, a document (Kyoichi Deki et al., the Institute of Electric Engineers of Japan, light/quantum device seminar material, volume OQD-97, No. 53–69, pp. 41–46, 1997).

From the above result, it becomes apparent that in conducting the wavelength conversion by using the CLBO crystal, if the atmosphere which is in contact with at least the outgoing end surface of the non-linear optical crystal from which the light that has been wavelength-converted is outputted becomes a gas which is smaller in the content of nitrogen element than air, and desirably if the atmosphere becomes an air which hardly contains nitrogen elements (N), the high-output wavelength conversion can be conducted stably for a long period as compared with a case in which the atmosphere is air.

First Embodiment

Figure 1:
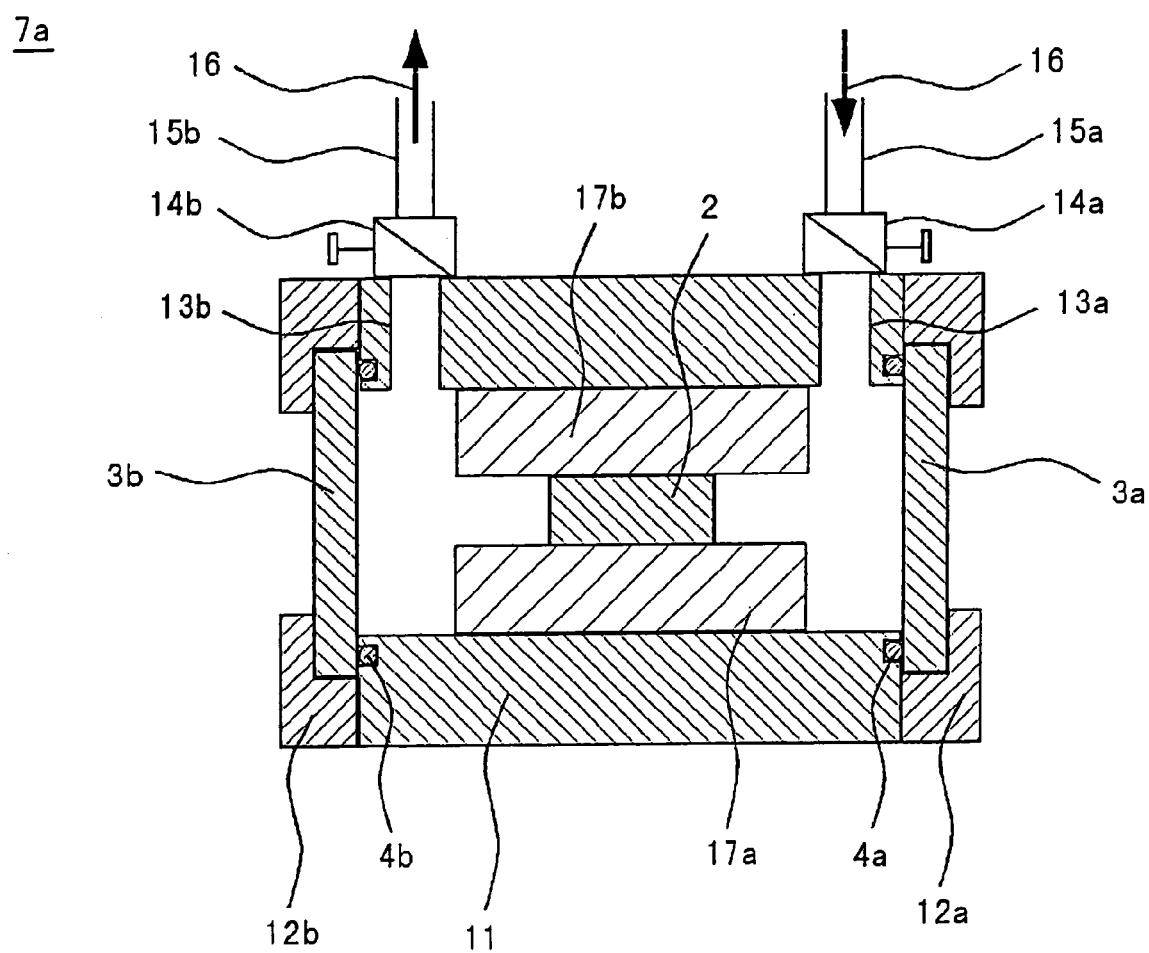
FIG. 1 is a longitudinally cross-sectional view showing a wavelength converting device in accordance with a first embodiment of the present invention.
Figure 2:
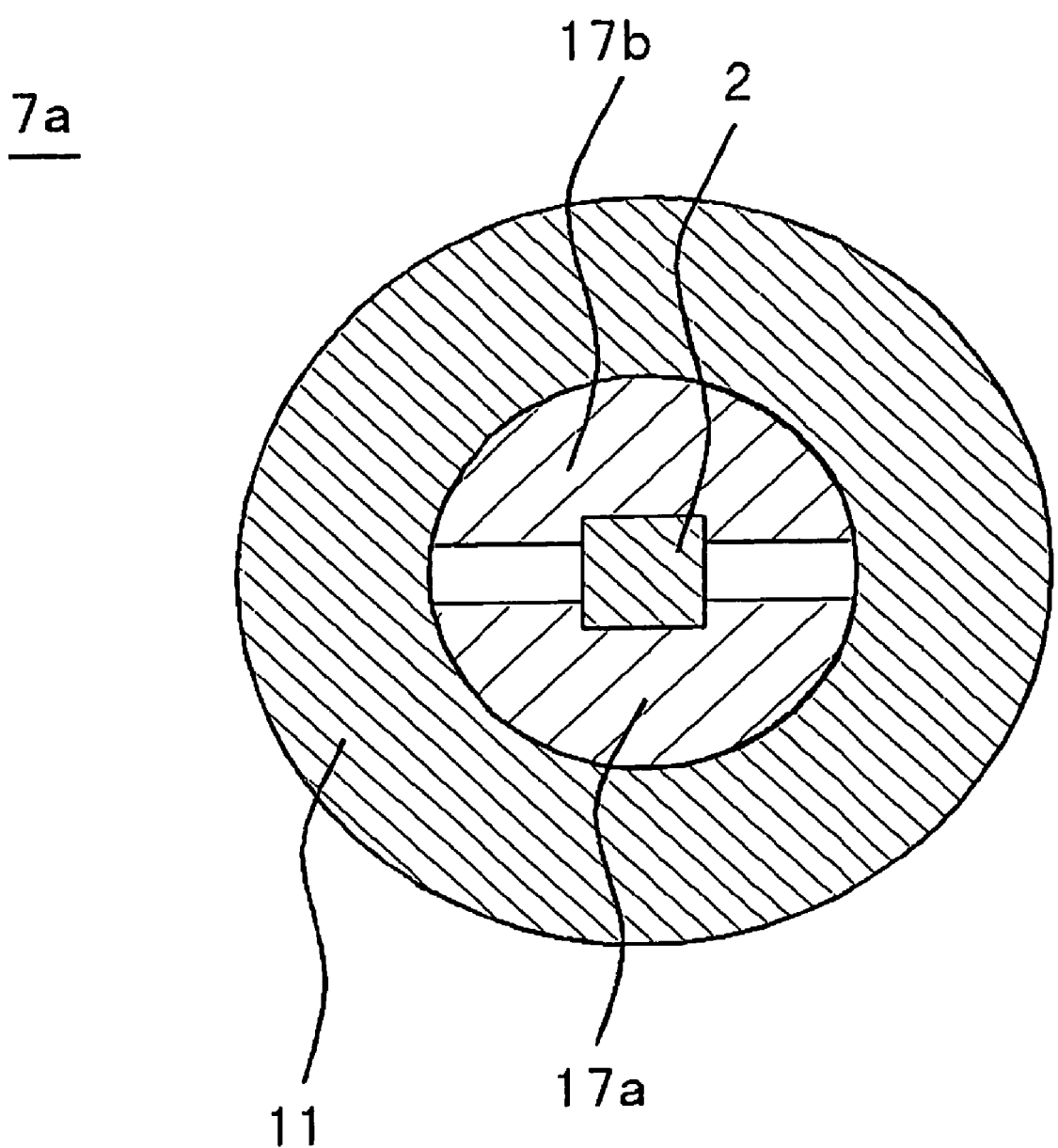
FIG. 2 is a laterally cross-sectional view showing a wavelength converting device in accordance with the first embodiment of the present invention.

FIGS. 1 and 2 are diagrams for explanation of a wavelength converting method and a wavelength converting device in accordance with a first embodiment for implementing the present invention, and more particularly, FIG. 1 is a longitudinally cross-sectional view of the wavelength converting device, and FIG. 2 is a laterally cross-sectional view of the wavelength converting device.

In FIGS. 1 and 2, reference numeral 2 denotes a non-linear optical crystal. Reference symbols 3a and 3b are optical windows through which a laser beam is transmitted. Reference symbols 4a and 4b are O-rings. Reference numeral 11 denotes a vessel for receiving the non-linear optical crystal 2. Reference symbols 12a and 12b are optical window supports. Reference symbols 13a and 13b are holes defined in the vessel 11. Reference symbols 14a and 14b are cocks. Reference symbols 15a and 15b are pipings. Reference numeral 16 is a gas that does not contain nitrogen element (N) or contains a little of nitrogen elements therein. Reference symbols 17a and 17b are fixing fittings for fixing the non-linear optical crystal 2 to the vessel 11. Reference symbol 7a shows the entire wavelength converting device.

The non-linear optical crystal 2 has both end surfaces cut and polished at a phase matching angle for generating an ultraviolet laser beam which is 400 nm or shorter in wavelength due to wavelength conversion, and is fixed on the vessel 11 due to the fixing fittings 17a and 17b. In this example, the non-linear optical crystal 2 is made of a CLBO crystal, and both end surfaces of the non-linear optical crystal 2 are cut and polished at a phase matching angle for converting the laser beam which is 532 nm in wavelength into the ultraviolet laser beam which is 266 nm in wavelength.

The optical windows 3a and 3b are made of, for example, quartz (chemical expression: $SiO_2$) or calcium fluoride (chemical expression: $CaF_2$) which is transparent with respect to at least a laser beam which is 200 nm to 1500 nm in wavelength, and both end surfaces of the optical windows 3a and 3b are polished and brought in close contact with the vessel 11 by the optical window supports 12a and 12b through the O-rings 4a and 4b. The cocks 14a and 14b as used are what are directly joined to the vessel 11 by a PT screw (tapered screw for a tube). The vessel 11 is held air-tightly by the optical windows 3a, 3b, the O-rings 4a, 4b and the cocks 14a, 14b.

After the laser beam is inputted to the interior of the vessel 11 from the optical window 3a at an input side and is wavelength-converted by the non-linear optical crystal 2, the laser beam is outputted from the optical window 3b at an output side.

The gas 16 contains no nitrogen element (N) or contains a small amount of nitrogen element as a component, and mainly contains, for example, rare gas, oxygen gas ($O_2$), or carbon oxide gas ($CO_2$). The gas 16 is allowed to flow in the interior of the vessel 11 through the piping 15a and the cock 14a having a hole opened and is allowed to always flow out from the vessel 11 through the cock 14b having a hole opened and the piping 15b. For that reason, the vessel 11 is filled with the gas 16 that contains no nitrogen element or contains a small amount of nitrogen element as a component.

In the first embodiment, the wavelength converting device 7a is structured as described above, and the incident end surface of the non-linear optical crystal 2 to which the light to be wavelength-converted is inputted and the outgoing end surface of the non-linear optical crystal 2 from which the wavelength-converted light is outputted is exposed to the gas 16 that contains no nitrogen element or contains a small amount of nitrogen element as a component. Therefore, even if the ultraviolet laser beam which is 400 nm or shorter in wavelength is applied to the non-linear optical crystal 2 by conducting the wavelength conversion of the laser beam, no nitric acid compound such as cesium nitrate is generated, and there occurs no case in which the wavelength laser beam is strained by the nitric acid compound or the output is further lowered. Also, since the interior of the wavelength converting device 7a is not exposed to vacuum, the impurities are not generated in the vessel, and the impurities are not stuck onto the non-linear optical crystal 2 or the optical window. Therefore, there can be obtained such an advantage that the wavelength converting laser beam, which is high in quality and high in output, can be generated stably for a long period.

Also, since the gas 16 is circulated so as to flow in the interior of the vessel 11 and to always flow out from the vessel 11, even if the impurities are generated, the impurities are exhausted together with the circulating gas 16. Therefore, there can be obtained such an advantage that the impurities can be prevented from being stuck onto the non-linear optical crystal 2 or the optical windows 3a, 3b.

Also, since it is unnecessary that the wavelength converting device 7a is structured by a strictly air tight vessel, and the high-output wavelength converting laser beam can be generated stably for a long period, the wavelength converting device can be provided inexpensively.

The non-linear optical crystal 2 is suitably made of a crystal containing cesium such as a cesium/lithium/borate (chemical expression: $CsLiB_6O_{10}$, abbreviated name: CLBO) crystal, cesium/borate (chemical expression: $CsB_3O_5$, abbreviated name: CBO) crystal, but even if the non-linear optical crystal 2 is made of a crystal containing no cesium such as a lithium/borate (chemical expression: $LiB_3O_5$, abbreviated name: LBO) crystal, beta/barium/borate (chemical expression: $\beta\text{-}BaB_2O_4$, abbreviated name: BBO) crystal or gadolinium/yttrium/calcium/oxyborate (chemical expression: $Gd_xY_{1-x}Ca_4(BO_3)_3$, abbreviated name: GdYCOB) crystal, since there is the possibility that elements other than cesium reacts with nitrogen to form nitrogen compound, those crystals can be used.

Also, a columnar vessel is exemplified as the vessel 11, but any shape is applicable to the vessel 11, and for example, a cube or rectangular parallelepiped may be applied to the vessel 11.

Also, there is exemplified that the cocks 14a and 14b are directly joined to the vessel 11 by, for example, a PT screw or an O-ring, but those cocks 14a and 14b may be disposed on midway of the piping.

Also, in the above-mentioned first embodiment, an example is described in which the gas 16 that contains no nitrogen gas or a small amount of nitrogen elements is allowed to always flow by opening the cocks 14a and 14b. However, after the vessel 11 is filled with the gas 16 that contains no nitrogen element or a small amount of nitrogen element, the cocks 14a and 14b are closed and the gas 16 is air-tightly sealed within the vessel 11, that is, the non-linear optical crystal may be used as a cell for sealing, and the same advantages as those in the first embodiment are obtained. In this case, there is not obtained the advantage caused by circulating the gas 16.

Second Embodiment

Figure 3:
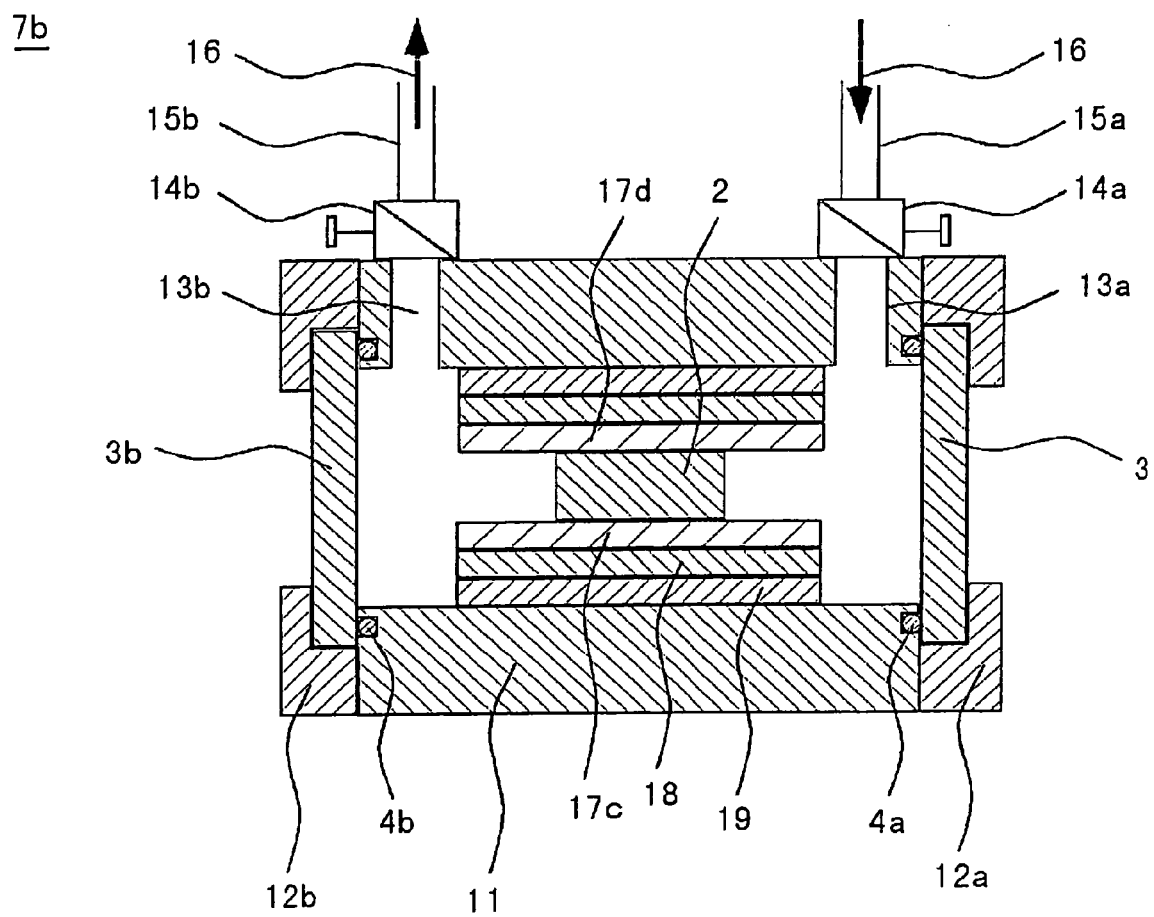
FIG. 3 is a longitudinally cross-sectional view showing a wavelength converting device in accordance with a second embodiment of the present invention.
Figure 4:
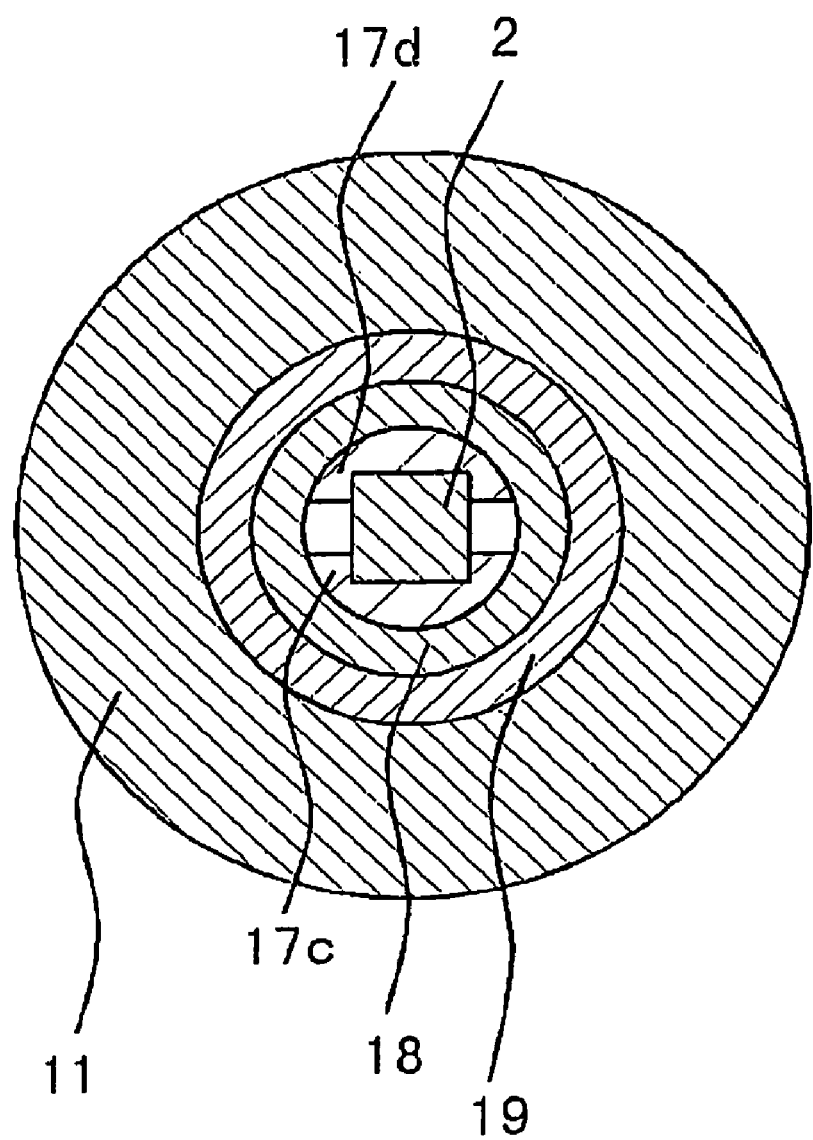
FIG. 4 is a laterally cross-sectional view showing a wavelength converting device in accordance with the second embodiment of the present invention.

FIGS. 3 and 4 are diagrams for explanation of a wavelength converting method and a wavelength converting device in accordance with a second embodiment for implementing the present invention, and more particularly, FIG. 3 is a longitudinally cross-sectional view of the wavelength converting device, and FIG. 4 is a laterally cross-sectional view of the wavelength converting device.

In FIGS. 3 and 4, reference numerals 2, 3a, 3b, 4a, 4b, 11, 12a, 12b, 13a, 13b, 14a, 14b, 15a, 15b, and 16 are identical with those shown in the above-mentioned first embodiment and conduct the same actions. Reference numerals 17c and 17d denote fixing jigs for fixing the non-linear optical crystal 2 onto the heating element 18. Reference numeral 18 denotes a heating element having an electrothermal heater. Reference numeral 19 denote a heat insulating material. Reference numeral 7b shows the entire wavelength converting device. Also, although not shown, a temperature sensor for monitoring a temperature is disposed within the heating element 18, and the heating element 18 and the temperature sensor are connected to an external temperature controller of the wavelength converting device 7b through an electric wire (not shown).

The heating element 18 holds the temperature of the non-linear optical crystal 2 to a constant temperature of 100° C. or higher by controlling a current that flows in the electrothermal heater in accordance with a signal from the temperature sensor by the temperature controller and controlling the temperature of the heating element 18 to a constant temperature that exceeds 100° C.

The laser beam is inputted to the interior of the vessel 11 from the optical window 3a on the input side, and is wavelength-converted by the non-linear optical crystal 2, and thereafter the laser beam is outputted from the optical window 3b on the output side.

In the second embodiment, the wavelength converting device 7b is structured as described above, and the non-linear optical crystal 2 is held to the constant temperature of 100° C. or higher. As a result, even in the case where a small amount of moisture is contained in the gas 16, because the non-linear optical crystal 2 does not absorb the moisture, there can be obtained such an advantage that the wavelength converting laser beam is generated stably for a long period.

Also, like in the first embodiment, the incident end surface of the non-linear optical crystal 2 to which the light to be wavelength-converted is inputted and the outgoing end surface of the non-linear optical crystal 2 from which the wavelength-converted light is outputted is exposed to the gas 16 that contains no nitrogen element or contains a small amount of nitrogen element as a component. Therefore, even if the ultraviolet laser beam which is 400 nm or shorter in wavelength is applied to the non-linear optical crystal 2 by conducting the wavelength conversion of the laser beam, no nitric acid compound such as cesium nitride is generated. Also, since the interior of the wavelength converting device 7a is not exposed to vacuum, the impurities are not generated in the vessel, and therefore, there can be obtained such an advantage that the wavelength converting laser beam which is high in quality and high in output can be generated stably for a long period. Also, since it is unnecessary that the wavelength converting device 7b is formed of the vacuum vessel, there can be obtained such an advantage that the wavelength converting device can be provided inexpensively.

Also, even if the impurities are generated, the impurities are exhausted together with the circulating gas 16. Therefore, there can be obtained such an advantage that the impurities can be prevented from being stuck onto the non-linear optical crystal 2 or the optical windows 3a, 3b.

Also, a columnar vessel is exemplified as the vessel 11, but any shape is applicable to the vessel 11, and for example, a cube or rectangular parallelepiped may be applied to the vessel 11.

Also, there is exemplified that the cocks 14a and 14b are directly joined to the vessel 11 by, for example, a PT screw or an O-ring, but those cocks 14a and 14b may not be disposed on midway of the piping.

Also, this example shows that the electrothermal heater is disposed as the heating element 18, but the heating element 18 is not limited thereto and may be formed of a heatable element such as the Peltier element.

In addition, in the above-mentioned second embodiment, an example is described in which the gas 16 that contains no nitrogen element or a small amount of nitrogen element is allowed to always flow by opening the cocks 14a and 14b. However, after the vessel 11 is filled with the gas 16 that contains no nitrogen element or a small amount of nitrogen elements, the cocks 14a and 14b are closed and the gas 16 is air-tightly sealed within the vessel 11 for use, and the same advantages as those in the above-mentioned second embodiment are obtained. In this case, there is not obtained the advantage caused by circulating the gas 16.

Third Embodiment

Figure 5:
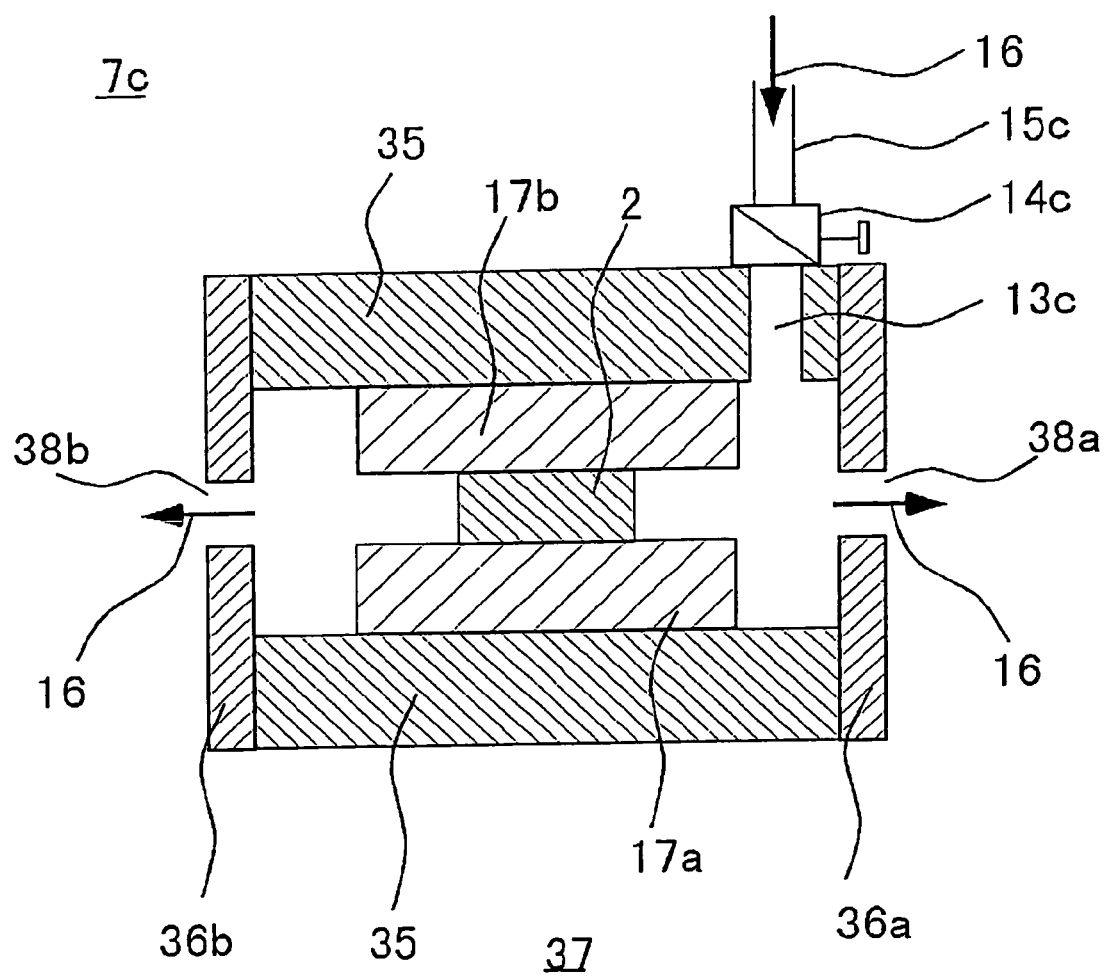
FIG. 5 is a longitudinally cross-sectional view showing a wavelength converting device in accordance with a third embodiment of the present invention.

FIG. 5 is a diagram for explanation of a wavelength converting method and a wavelength converting device in accordance with a third embodiment for implementing the present invention, and more particularly, FIG. 5 is a longitudinally cross-sectional view of the wavelength converting device.

In FIG. 5, reference numerals 2, 16, 17a, and 17b are identical with those shown in the above-mentioned first embodiment and conduct the same actions. Reference numeral 35 denotes a vessel main body; 36a and 36b, caps; and 37, a vessel. Reference numerals 38a and 38b denote holes which are opened in the caps 36a and 36b, and through which a light passes. Reference numeral 13c denotes a hole opened in the vessel main body 35. Reference numeral 14c denotes a cock. Reference numeral 15c denotes a piping, and reference numeral 7c denotes the entire wavelength converting device.

The vessel 37 is made up of the vessel main body 35 and the caps 36a, 36b, and holes 38a and 38b through which a light pass are opened in the cap 36a and the cap 36b, respectively.

The gas 16 that mainly contains a gas other than nitrogen, for example, a gas that mainly contains a rare gas, an oxygen gas, a carbon dioxide gas, or the like is allowed to flow in the vessel 37 from the hole 13c formed in the vessel main body 35 from the piping 15c through the cock 14c. The gas 16 is filled within the vessel 37 by replacing the air within the vessel 37 and exhausted from the holes 38a and 38b.

As described above, it is unnecessary that the vessel 37 is air-tight, and the atmosphere of the non-linear optical crystal 2 may be a gas that contains no nitrogen elements or contains a small amount of nitrogen elements. Also, the gas that is in contact with the surface of the non-linear optical crystal 2 from which the wavelength-converted light is outputted may be a gas that contains no nitrogen elements or a small amount of nitrogen elements, and the same advantages as those in the above-mentioned first embodiment are obtained.

In the same manner as in the above-mentioned second embodiment, there are disposed the heating element 18 and the heat insulating material 19 so that the non-linear optical crystal 2 is held to a constant temperature of 100° C. or higher.

In the above-mentioned first to third embodiments, the atmosphere of the non-linear optical crystal 2 is set to a gas that contains no nitrogen elements or a small amount of nitrogen elements. However, if a gas that is smaller in the content of nitrogen elements than at least air is employed, the high-output wavelength conversion can be conducted stably for a long period as compared with a case where the atmosphere is air. It is preferable that the volume content of nitrogen is 10% or less, and it is more preferable that the volume content of nitrogen is 1% or less. Therefore, the gas that mainly contains a rare gas, an oxygen gas, a carbon dioxide gas, or the like which is allowed to flow in or be sealed within the vessel where the non-linear optical crystal 2 is disposed may not be a gas that is high in purity and an inexpensive gas that is low in grade can be used. In the gas that mainly contains a rare gas, an oxygen gas, a carbon dioxide gas or the like, it is preferable that the volume content of those gases is, for example, 50% or more, and it is more preferable that the volume content of those gases is 90% or more, further 99% or more.

Forth Embodiment

Figure 6:
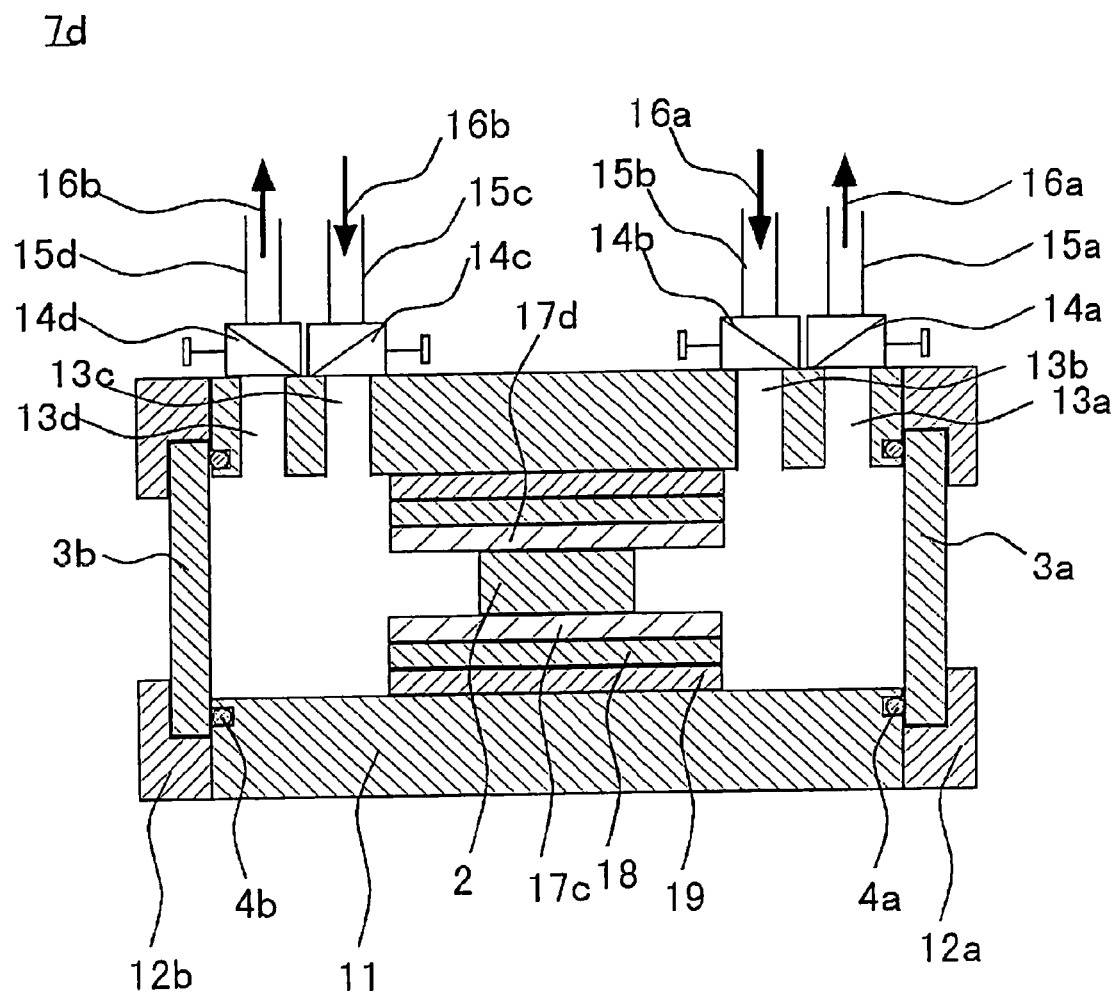
FIG. 6 is a longitudinally cross-sectional view showing a wavelength converting device in accordance with a fourth embodiment of the present invention.

FIG. 6 is a diagram for explanation of a wavelength converting method and a wavelength converting device in accordance with a fourth embodiment for implementing the present invention, and more particularly, FIG. 6 is a longitudinally cross-sectional view of the wavelength converting device.

In FIG. 6, reference numerals 2, 3a, 3b, 4a, 4b, 11, 12a, 12b, 17c, 17d, 18, and 19 are identical with those shown in the above-mentioned first or second embodiment and conduct the same actions. Reference numerals 13a, 13b, 13c, and 13d denote holes opened in the vessel 11. Reference numerals 14a, 14b, 14c, and 14d denote cocks. Reference numerals 15a, 15b, 15c, and 15d denote pipings. Reference numeral 16b denote a gas that contains no nitrogen element (N) or a small amount of nitrogen element as a component. Reference numeral 16a denote a gas having a component different from that of the gas 16b. Reference numeral 7d denotes the entire wavelength converting device. Although not shown in FIG. 6, a space that is in contact with the incident end surface of the non-linear optical crystal 2 to which the light to be wavelength-converted is inputted and a space that is in contact with the outgoing end surface from which the wavelength converted light is outputted are separated by, for example, a partition.

The non-linear optical crystal 2 has both end surfaces cut and polished at a phase machining angle for generating the ultraviolet laser beam which is 400 nm or shorter in wavelength by wavelength conversion, and is fixed onto the vessel 11 by the fixing jigs 17c and 17d. In this example, the non-linear optical crystal 2 is made of a CLBO crystal, and both end surfaces of the non-linear optical crystal are cut and polished at a phase machining angle for converting the laser beam which is 532 nm in wavelength into the ultraviolet laser beam which is 266 nm in wavelength.

After the laser beam is inputted to the interior of the vessel 11 from the optical window 3a on the input side and is wavelength-converted by the non-linear optical crystal 2, the laser beam is outputted from the optical window 3b on the output side.

The gas 16a enters a space that is in contact with the incident end surface of the non-linear optical crystal 2 within the vessel 11 through the cock 14b and the hole 13b from the piping 15b, and the gas 16a is exhausted from the vessel 11 through the hole 13a, the cock 14a, and the piping 15a with the atmosphere that is in contact with the incident end surface of the non-linear optical crystal 2 as the atmosphere of the gas 16a. Also, the gas 16b enters a space that is in contact with the outgoing end surface of the non-linear optical crystal 2 within the vessel 11 through the cock 14c and the hole 13c from the piping 15c, and the gas 16b is exhausted from the vessel 11 through the hole 13d, the cock 14d and the piping 15d with the atmosphere that is in contact with the outgoing end surface of the non-linear optical crystal 2 as the atmosphere of the gas 16b.

In the fourth embodiment, the wavelength converting device 7d is structured as described above, and the outgoing end surface of the non-linear optical crystal 2 is exposed to the gas 16b contains no nitrogen element or contains a small amount of nitrogen element as a component. Therefore, even if the ultraviolet laser beam which is 400 nm or shorter in wavelength is applied to the outgoing end surface of the non-linear optical crystal 2 by conducting the wavelength conversion of the laser beam, no nitric acid compound such as cesium nitrate is generated, and there occurs no case in which the wavelength laser beam is strained by the nitric acid compound or the output is further lowered. Therefore, there can be obtained such an advantage that the wavelength converting laser beam, which is high in quality and high in output, can be generated stably for a long period.

Also, since the atmosphere that is in contact with the incident end surface of the non-linear optical crystal 2 and the atmosphere that is in contact with the outgoing end surface thereof are formed of the gas 16a and the gas 16b which are different in component, respectively, there can be obtained such an advantage that an interaction of the non-linear optical crystal 2 with the atmosphere which is caused by the wavelength converted light, that is, an incident laser beam which is a fundamental wave of the wavelength conversion 2, and an interaction of the non-linear optical crystal 2 with the atmosphere which is caused by the wavelength converted light, that is, the wavelength converted laser beam can be prevented with a high efficiency, respectively. In addition, since it is unnecessary that the wavelength converting device 7d is formed of the vacuum vessel, there can be obtained such advantages that the impurities are not generated in the vessel and the wavelength converting device can be provided more inexpensively.

Also, since the gas 16a is circulated so as to flow into the space that is in contact with the incident end surface of the non-linear optical crystal 2 within the vessel 11 to which the light to be wavelength-converted is inputted and thereafter to flow out from the space, even if the impurities are generated, the impurities are exhausted together with the circulating gas 16a. Also, since the gas 16b is circulated so as to flow into the space that is in contact with the outgoing end surface of the non-linear optical crystal 2 within the vessel 11 from which the wavelength-converted light is outputted and thereafter to flow out from the space, even if the impurities are generated, the impurities are exhausted together with the circulating gas 16b. Therefore, there is obtained such an advantage that the impurities can be prevented from being stuck to the non-linear optical crystal 2 or the optical windows 3a, 3b.

Also, in the same manner as in the second embodiment, there are disposed the heating element 18 and the heat insulating material 19, and the non-linear optical crystal 2 is held to a constant temperature of 100° C. or higher, whereby the non-linear optical crystal 2 does not absorb the moisture even if a slight amount of moisture is contained in the gases 16a and 16b, and therefore there is obtained such an advantage that the wavelength laser beam can be generated stably for a long period. However, the heating element 18 and the heat insulating material 19 may not necessarily provided.

As the gas that contains no nitrogen element or a small amount of nitrogen elements used in the fourth embodiment, if a gas that is smaller in the content of nitrogen element than at least air is employed, the wavelength conversion that is high in output and stable for a long period as compared with the wavelength conversion in the case where the atmosphere is air can be obtained. It is preferable that the volume content of nitrogen is 10% or less, and it is more preferable that the volume content of nitrogen is 1% or less.

The present inventors have conducted a further test in order to investigate the deterioration cause of the wavelength conversion characteristic using the CLBO crystal. For example, in the case of conducting a 100-hour continuous ultraviolet laser beam generation test where: the wavelength converting device 7b shown in the second embodiment is employed; the CLBO crystal is employed as the non-linear optical device 2; an oxygen gas (volume content: 99.7%) is employed as the gas 16 when a laser beam that is 532 nm in wavelength is made incident to the CLBO crystal and converted into an ultraviolet laser beam which is 266 nm in wavelength; and the CLBO crystal is arranged in an oxygen ($O_2$) atmosphere, there is found no change in the laser beam incident end surface of the CLBO crystal which is 532 nm in wavelength as compared with that before the start of the test, but a discoloration is found on the laser beam passing portion on the wavelength 266 nm ultraviolet laser beam outgoing end surface of the CLBO crystal, but there is found no change in the outgoing end surface other than the laser beam passing portion, and the output can be held to 20 W. Also, in the case where argon (volume content: 99.9%) is used as the gas 16, and the CLBO crystal is disposed in the argon gas (Ar) atmosphere to conduct the ultraviolet laser beam generation test, there is found a discoloration on the laser beam passing portion on the wavelength 532 nm laser beam incident end surface of the CLBO crystal, but there is a case in which the wavelength 266 nm ultraviolet laser beam outgoing end surface of the CLBO crystal does not change as compared with that before the start of the test.

Accordingly, in the case where the CLBO crystal is used as the non-linear optical crystal 2, when the atmosphere that is in contact with the wavelength 266 nm ultraviolet laser beam outgoing end surface of the CLBO crystal is made of a gas that is smaller in the content of nitrogen element than air and is a gas other than oxygen, for example, an atmosphere of a gas that mainly contains argon gas (Ar), and the atmosphere that is in contact with the wavelength 532 nm laser beam incident end surface is made of a gas other than the argon gas, for example, an atmosphere of a gas or air which mainly contains oxygen gas ($O_2$), the interaction of the non-linear optical crystal 2 with the atmosphere can be more surely prevented, thereby being capable of generating stably the wavelength conversion laser beam that is high in quality and high in output for a longer period.

The non-linear optical crystal 2 is suitably made of a crystal containing cesium such as a cesium/lithium/borate (chemical expression: $CsLiB_6O_{10}$, abbreviated name: CLBO) crystal, cesium/borate (chemical expression: $CsB_3O_5$, abbreviated name: CBO) crystal, but even if the non-linear optical crystal 2 is made of a crystal containing no cesium such as a lithium/borate (chemical expression: $LiB_3O_5$, abbreviated name: LBO) crystal, beta/barium/borate (chemical expression: $\beta$-$BaB_2O_4$, abbreviated name: BBO) crystal, or gadolinium/yttrium/calcium/oxyborate (chemical expression: $Gd_xY_{1-x}Ca_4(BO_3)_3$, abbreviated name: GdYCOB) crystal, since there is the possibility that elements other than cesium reacts with nitrogen to form nitrogen compound, those crystals can be used.

Also, in the above-mentioned fourth embodiment, an example is described in which the cocks 14a, 14b, 14c and 14d are opened so that the gases 16a and 16b are allowed to always flow. Alternatively, it is possible that after the space that is in contact with the incident end surface of the non-linear optical crystal 2 and the space that is in contact with the outgoing end surface thereof are filled with the gas 16a and the gas 16b, respectively, the cocks 14a, 14b, 14c and 14d are closed, and the air 16a and the air 16b are air-tightly sealed in the respective spaces within the vessel 11, that is, the non-linear optical crystal 2 may be used as a cell for sealing the non-linear optical coupling 2, and the same advantages as those in the above-mentioned fourth embodiment are obtained. In this case, there is obtained no advantage caused by circulating the gases 16a and 16b.

Fifth Embodiment

Figure 7:
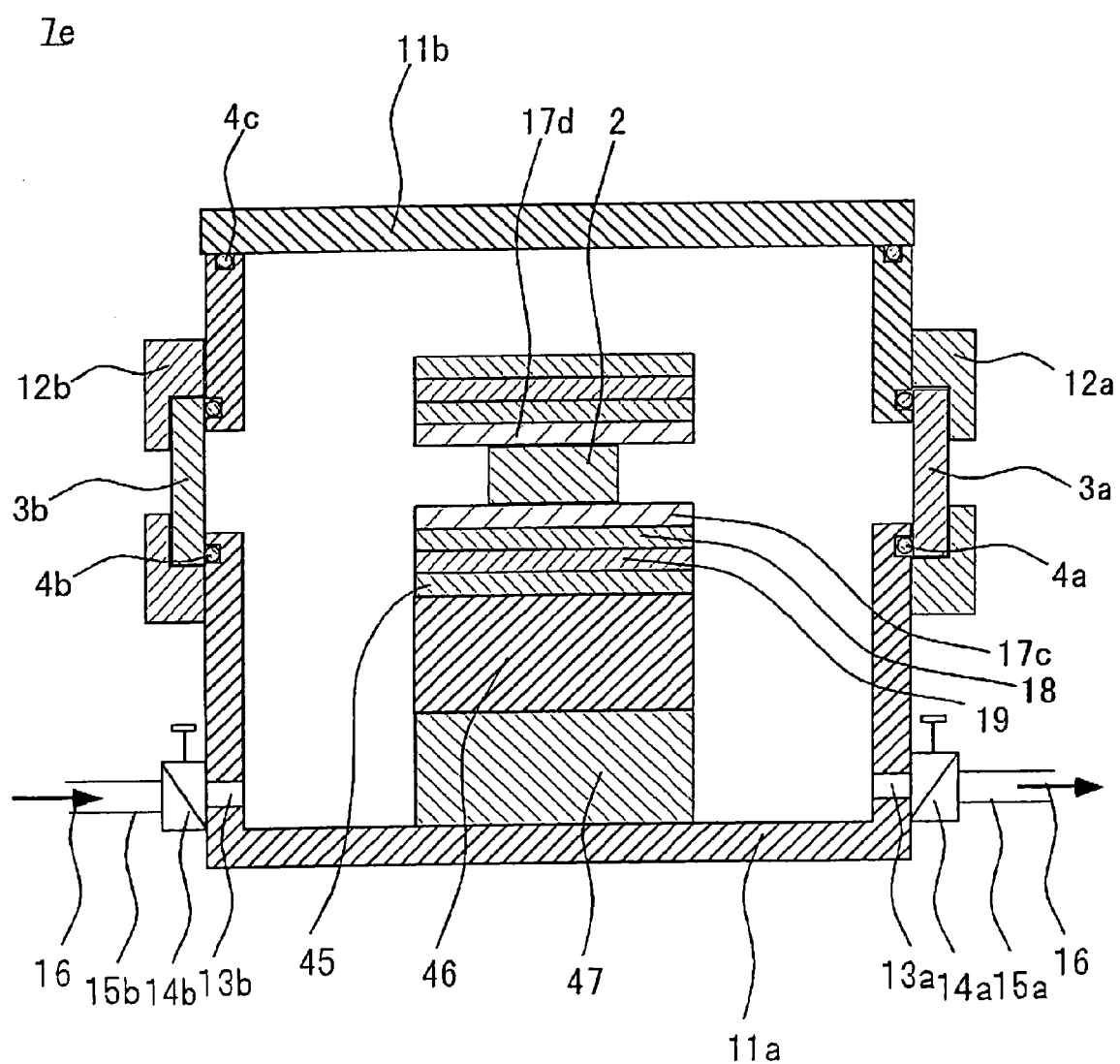
FIG. 7 is a longitudinally cross-sectional view showing a wavelength converting device in accordance with a fifth embodiment of the present invention.

FIG. 7 is a diagram for explanation of a wavelength converting method and a wavelength converting device in accordance with a fifth embodiment for implementing the present invention, and more particularly, FIG. 7 is a longitudinally cross-sectional view of the wavelength converting device.

In FIG. 7, reference numerals 2, 3a, 3b, 4a, 4b, 12a, 12b, 13a, 13b, 14a, 14b, 15a, 15b, 16, 17c, 17d, 18, and 19 are identical with those shown in the above-mentioned first or second embodiment and conduct the same actions. Reference numeral 4c denotes an O-ring; 11a is a vessel; 11b, a cap of the vessel 11a; 45, a fixing jig for fixing the heat insulating material 19; 46, an angle adjuster corresponding to means for adjusting an angle of the non-linear optical crystal 2 with respect to the incident light; 47, a position adjuster corresponding to means for adjusting an incident-light passing position in the non-linear optical crystal 2; and 7e, the entire wavelength converting device.

The optical windows 3a, 3b, the O-rings 4a, 4b and the cocks 14a, 14b are attached onto the vessel 11a, and the angle of the non-linear optical crystal 2 with respect to the laser beam is adjusted by the angle adjuster 46 while the laser beam is allowed to pass through the non-linear optical crystal 2 through the optical windows 3a and 3b in a state where the cap 11b is opened, and the laser beam passing position of the non-linear optical crystal 2 is adjusted by the position adjuster 47 so that the output of the wavelength conversion laser beam which is generated by the non-linear optical crystal 2 is adjusted to a desired output. Thereafter, the cap 11b is closed so as to keep the vessel 11a air-tightly. Thereafter, the gas 16 that contains no nitrogen elements (N) or a small amount of nitrogen elements as a component is caused flow in such a manner that the vessel 11a is filled with the gas 16 that contains no nitrogen elements (N) or a small amount of nitrogen elements as a component.

In the fifth embodiment, since the wavelength converting device 7e is structured as described above, and the angle adjuster 46 and the position adjuster 47 are provided, in the case where the wavelength converting device 7e operates with a high output for a long period by using a gas that mainly contains an oxygen gas or an argon gas as the gas 16, for example, as described in the fourth embodiment, the laser beam passing portion on the laser beam outgoing end surface or the laser beam incident surface of the CLBO crystal which is the non-linear optical crystal 2 may be discolored. However, in this case, the laser beam passing portion of the non-linear optical crystal 2 is shifted to a portion where there is no discoloration by the position adjuster 47, and the angle of the non-linear optical crystal 2 is adjusted by the angle adjuster 46, and as a result, there is obtained such an advantage that the output of the wavelength conversion laser beam can be returned to an output before the laser beam passing portion of the non-linear optical crystal 2 is deteriorated, and the lifetime of the non-linear optical crystal 2 can be substantially elongated.

Also, in the same manner as in the first embodiment, because the non-linear optical crystal 2 is exposed to the gas 16 contains no nitrogen element or contains a small amount of nitrogen element as a component, even if the ultraviolet laser beam which is 400 nm or shorter in wavelength is applied to the non-linear optical crystal 2 by conducting the wavelength conversion of the laser beam, no nitric acid compound such as cesium nitrate is generated, and since the interior of the wavelength converting device 7e is not exposed to vacuum, the impurities are not generated in the vessel, with the result that there is obtained such an advantage that the wavelength converting laser beam which is high in quality and high in output can be generated stably for a long period.

In addition, in the same manner as in the second embodiment, there are disposed the heating element 18 and the heat insulating material 19, and the non-linear optical crystal 2 is held to a constant temperature of 100° C. or higher, whereby the non-linear optical crystal does not absorb the moisture even if a slight amount of moisture is contained in the gas 16, and therefore there is obtained such an advantage that the wavelength laser beam can be generated stably for a long period.

In the above-mentioned fifth embodiment, there is shown a case in which the angle adjuster 46 and the position adjuster 47 are disposed in the same wavelength converting device as that described in the second embodiment, but the present invention is not limited to this, and the angle adjuster 46 and the position adjuster 47 may be disposed in the same wavelength converting device as that described in the first, third and fourth embodiments, and there can be obtained the same advantages.

Sixth Embodiment

Figure 8:
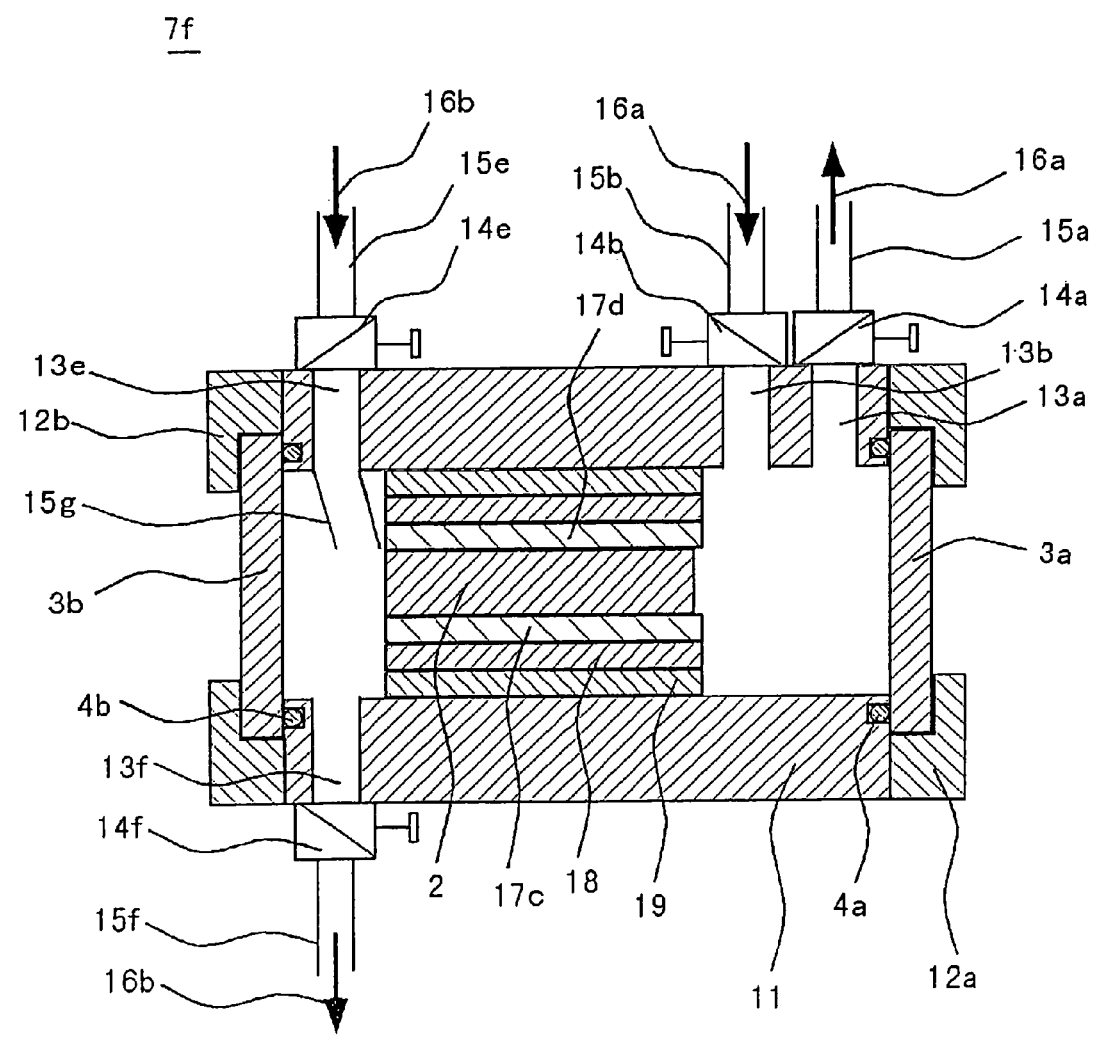
FIG. 8 is a longitudinally cross-sectional view showing a wavelength converting device in accordance with a sixth embodiment of the present invention.

FIG. 8 is a diagram for explanation of a wavelength converting method and a wavelength converting device in accordance with a sixth embodiment for implementing the present invention, and more particularly, FIG. 8 is a longitudinally cross-sectional view of the wavelength converting device.

In FIG. 8, reference numerals 2, 3a, 3b, 4a, 4b, 11, 12a, 12b, 13a, 13b, 14a, 14b, 15a, 15b, 16a, 16b, 17c, 17d, 18, and 19 are identical with those shown in the above-mentioned fourth embodiment and conduct the same actions. Reference numerals 13e and 13f denote holes opened in the vessel 11; 14e and 14f, cocks; 15e and 15f, pipings; and 15g, a piping which corresponds to means for supplying a gas that is smaller in the content of nitrogen element than air to the vicinity of the outgoing end surface of the non-linear optical crystal 2. The piping 15g is coupled to the hole 13e for inserting the gas 16b into the vessel 11 and disposed so as to extend to the vicinity of the outgoing end surface of the non-linear optical crystal 2. Also, the hole 13f is disposed at a position opposite to the piping 15g with the non-linear optical crystal 2 intervened therebetween. Reference numeral 7f denotes the entire wavelength converting device. Although being not shown in FIG. 8, the space that is in contact with the incident end surface of the non-linear optical crystal 2 and the space that is in contact with the outgoing end surface are separated from each other by, for example, a partition, as in the fourth embodiment.

The non-linear optical crystal 2 has both end surfaces thereof cut and polished at a phase matching angle for generating an ultraviolet laser beam which is 400 nm or shorter in wavelength due to wavelength conversion, and fixed on the vessel 11 by the fixing fittings 17c and 17d. In this example, the non-linear optical crystal 2 is made of a CLBO crystal, and both end surfaces of the non-linear optical crystal 2 are cut and polished at a phase matching angle for converting the laser beam which is 532 nm in wavelength into the ultraviolet laser beam which is 266 nm in wavelength.

After the laser beam enters the interior of the vessel 11 from the optical window 3a at an input side and is wavelength-converted by the non-linear optical crystal 2, the laser beam is outputted from the optical window 3b at an output side.

The gas 16a enters the space that is in contact with the incident end surface of the non-linear optical crystal 2 within the vessel 11 from the piping 15b through the cock 14b and the hole 13b, and is then exhausted toward the external of the vessel 11 through the hole 13a, the cock 14a and the piping 15a with the atmosphere that is in contact with the incident end surface of the non-linear optical crystal 2 as the atmosphere of the gas 16a.

The gas 16b is allowed to flow in the vicinity of the outgoing end surface of the non-linear optical crystal 2 within the vessel 11 from the piping 15e through the cock 14e, the hole 13e and the piping 15g at a given flow rate (for example, flow rate of 0.1 l/min), and is then exhausted toward the external of the vessel 11 through the hole 13f, the cock 14f and the piping 15f with the atmosphere that is in contact with the outgoing end surface of the non-linear optical crystal 2 as the atmosphere of the gas 16b. The flow rate of the gas 16b is measured by a flow meter in such a manner that, for example, a gas bomb not shown in the figure is connected to the piping 15e through a flow rate adjusting valve not shown in the figure and a flow meter not shown in the figure, and the flow rate of the gas 16b is adjusted by adjustment of the flow rate adjusting valve.

In the sixth embodiment, the wavelength converting device 7f is structured as described above, and the following advantages are obtained in addition to the same advantages as those described in the fourth embodiment.

That is, since the gas 16b is allowed to flow into the vicinity of the outgoing end surface of the non-linear optical crystal 2, even if the impurities occur from the structural material etc. within the vessel 11, because a flesh gas 16 that just now flows therein is supplied to the outgoing end surface of the non-linear optical crystal 2, the impurities are prevented from being stuck onto the outgoing end surface of the non-linear optical crystal 2 and are also prevented from being stuck onto a portion of the optical window 3b which is close to the non-linear optical crystal 2, with the result that such an advantage that the wavelength conversion laser beam which is high in quality and high in output stably for a long period can be generated is enhanced. Also, since the hole 13f is formed at a position opposite to the piping 15g which is a flow inlet of the gas 16b into the vessel 11 with the non-linear optical crystal 2 being intervened therebetween, even if the impurities occur from the structural material etc. within the vessel 11, because the impurities can be efficiently removed from the interior of the vessel 11, the impurities are prevented from being stuck onto the outgoing end surface of the non-linear optical crystal 2 and the optical window 3b, with the result that such an advantage that the wavelength conversion laser beam which is high in quality and high in output stably for a long period can be generated is further enhanced.

Also, in the above-mentioned sixth embodiment, there is described an example in which the gas 16b is allowed to flow at a flow rate of 0.1 l/min, but when the flow rate increases to 1 l/min, or further up to 10 l/min, even if the impurities occur from the structural material etc. within the vessel 11, the impurities can be more surely prevented from being stuck onto the outgoing end surface of the non-Linear optical crystal 2 and a portion of the optical window 3b which is close to the non-linear optical crystal 2, with the result that such an advantage that the wavelength conversion laser beam which is high in quality and high in output can be generated stably for a long period is further enhanced.

Also, in the above-mentioned sixth embodiment, a structure is employed such that the gas 16b is allowed to flow into the vicinity of only the outgoing end surface of the non-linear optical crystal 2 and is then exhausted from the hole 13f that is opposite to the flow inlet 15g with a high efficiency. Further, the same structure is applied to the incident end surface side of the non-linear optical crystal 2 whereby even if the impurities occur from the structural material etc. within the vessel 11, the impurities are prevented from being stuck onto the incident end surface of the non-linear optical crystal 2 and a portion of the optical window 3a which is close to the non-linear optical crystal 2, with the result that such an advantage that the wavelength conversion laser beam which is high in quality and high in output more stably for a longer period can be generated is further enhanced.

The above-mentioned sixth embodiment shows a case in which the piping 15g is used as a means for supplying the gas 16 to the vicinity of at least the outgoing end surface of the non-linear optical crystal 2 within the vessel 11, but the present invention is not limited to this structure, and for example, it is possible that the inner wall of the vessel 11 is so structured as to reach the vicinity of the end surface of the non-linear optical crystal 2, and the gas 16 is supplied directly to the vicinity of the end surface of the non-linear optical crystal 2 from the holes 13b and 13e without using the piping 15g, and the same advantages as those in the above-mentioned sixth embodiment are obtained.

Seventh Embodiment

In the above-mentioned sixth embodiment, a case is described in which the gas that is smaller in the content of nitrogen element than air is supplied to the vicinity of the incident end surface or the outgoing end surface of the non-linear optical crystal 2 and thereafter exhausted in the wavelength converting method and the wavelength converting device in which the atmosphere which is in contact with the incident end surface of the non-linear optical crystal 2 and the atmosphere which is in contact with the outgoing end surface are made of the gases 16a and 16b which are different in component from each other, and the wavelength conversion is made as described in the fourth embodiment. However, the present invention is not limited to this structure, but for example, in the wavelength converting method and the wavelength converting device in which the atmosphere which is in contact with the incident end surface of the non-linear optical crystal 2 and the atmosphere which is in contact with the outgoing end surface thereof are made of the gas 16 having the same component and the wavelength conversion is made as described in the first to third embodiments and the fifth embodiment, it is possible that the gas 16 that is smaller in the content of nitrogen element than air is supplied to the vicinity of the incident end surface or the outgoing end surface of the non-linear optical crystal and thereafter exhausted.

Figure 9:
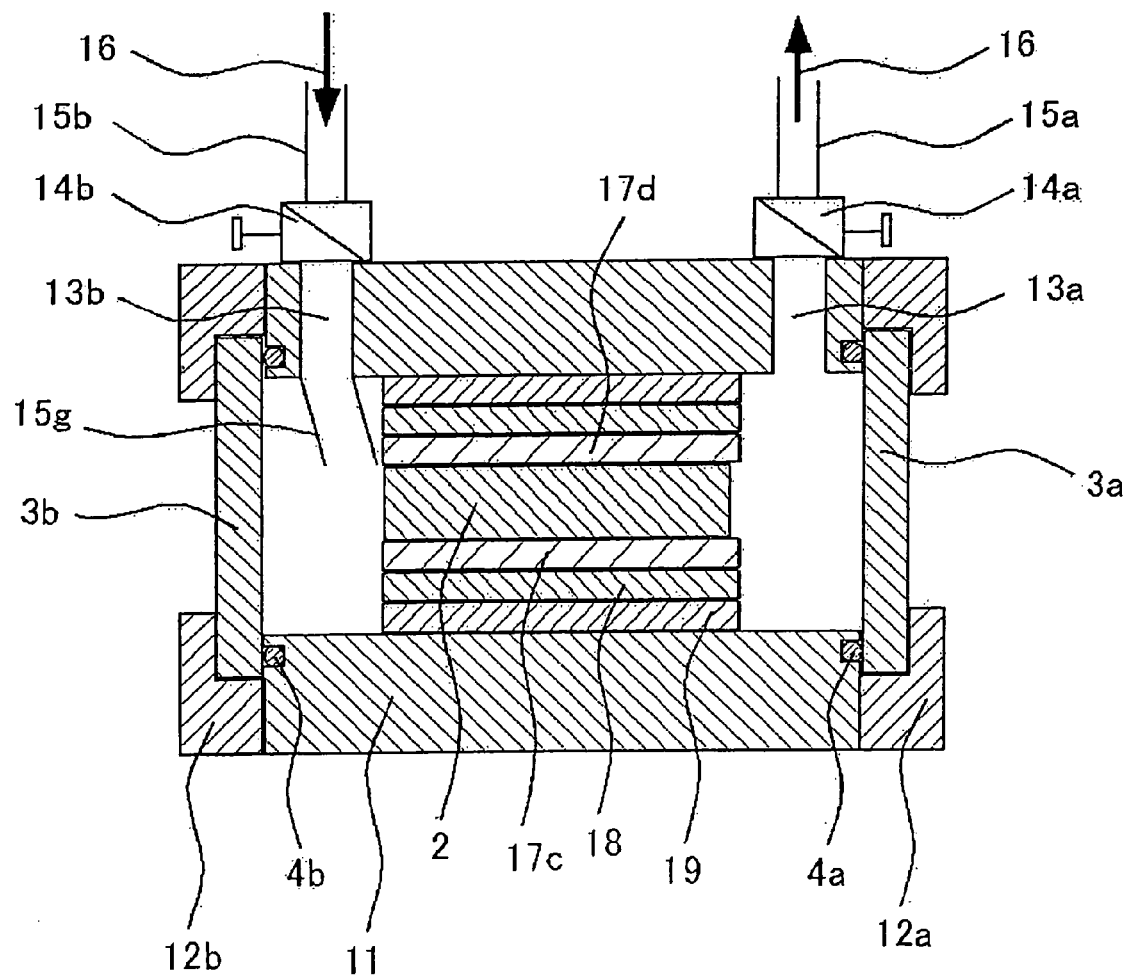
FIG. 9 is a longitudinally cross-sectional view showing a wavelength converting device in accordance with a seventh embodiment of the present invention.

FIG. 9 is a diagram for explanation of a wavelength converting method and a wavelength converting device in accordance with a seventh embodiment for implementing the present invention, and more particularly, FIG. 9 is a longitudinally cross-sectional view of the wavelength converting device.

In FIG. 9, reference symbols 2, 3a, 3b, 4a, 4b, 12a, 12b, 13a, 13b, 14a, 14b, 15a, 15b, 16, 17c, 17d, 18 and 19 are identical with those shown in the above-mentioned first and second embodiments and conduct the same actions. Also, reference symbol 15g is a piping as described in the above-mentioned sixth embodiment, which corresponds to a means for supplying a gas 16 that is smaller in the content of nitrogen element than air to the vicinity of the outgoing end surface of the non-linear optical crystal. Reference symbol 7g shows the entire wavelength converting device.

After the laser beam enters the interior of the vessel 11 from the optical window 3a at an input side and is wavelength-converted by the non-linear optical crystal 2, the laser beam is outputted from the optical window 3b at an output side.

The gas 16 is allowed to flow into the vicinity of the outgoing end surface of the non-linear optical crystal 2 within the vessel 11 from the piping 15b through the piping 15g which is coupled to the cock 14b, the hole 13b and the hole 13b at a given flow rate (for example, the flow rate of 0.1 l/min), and is then exhausted toward the external of the vessel 11 through the hole 13a, the cock 14a and the piping 15a with the atmosphere that is in contact with the outgoing end surface of the non-linear optical crystal 2 as the atmosphere of the gas 16. The flow rate of the gas 16 is measured by a flow meter in such a manner that, for example, a gas bomb not shown in the figure is connected to the piping 15b through a flow rate adjusting valve not shown in the figure and a flow meter not shown in the figure, and the flow rate of the gas 16 is adjusted by adjustment of the flow rate adjusting valve.

In the seventh embodiment, the wavelength converting device 7g is structured as described above, and the following advantages are obtained in addition to the same advantages as those described in the second embodiment.

That is, since the gas 16 is allowed to flow into the vicinity of the outgoing end surface of the non-linear optical crystal 2, even if the impurities occur from the structural material etc. within the vessel 11, because a flesh gas 16 that just now flows therein is supplied to the outgoing end surface of the non-linear optical crystal 2, the impurities are prevented from being stuck onto the outgoing end surface of the non-linear optical crystal 2 and are also prevented from being stuck onto a portion of the optical window 3b which is close to the non-linear optical crystal 2, with the result that such an advantage that the wavelength conversion laser beam which is high in quality and high in output stably for a long period can be generated is enhanced.

Also, in the above-mentioned seventh embodiment, there is described an example in which the gas 16b is allowed to flow at the flow rate of 0.1 l/min, but when the flow rate increases to 1 l/min, or further up to 10 l/min, even if the impurities occur from the structural material etc. within the vessel 11, the impurities can be more surely prevented from being stuck onto the outgoing end surface of the non-linear optical crystal 2 and a portion of the optical window 3b which is close to the non-linear optical crystal 2, with the result that such an advantage that the wavelength conversion laser beam which is high in quality and high in output stably for a long period can be generated is further enhanced.

Also, in the above-mentioned seventh embodiment, a structure is employed in which the gas 16 is supplied to the vicinity of the outgoing end surface of the non-linear optical crystal 2, but the gas 16 may be supplied to both of the outgoing end surface and the incident end surface of the non-linear optical crystal 2.

In the above-mentioned seventh embodiment, there is described a case in which a means (piping 15g) which supplies the gas 16 to the vicinity of at least the outgoing end surface of the non-linear optical crystal 2 within the vessel 11 is disposed in the same wavelength converting device as that described in the second embodiment. However, the present invention is not limited to this structure, and a means (piping 15g) which supplies the gas 16 to the vicinity of at least the outgoing end surface of the non-linear optical crystal 2 within the vessel 11 may be disposed in the same wavelength converting device as that described in the first, third or fourth embodiment, and the same advantages are obtained also in this case.

In the above-mentioned seventh embodiment, there is described a case in which the piping 15g is used as the means for supplying the gas 16 to the vicinity of the incident end surface or the outgoing end surface of the non-linear optical crystal 2 within the vessel 11. However the present invention is not limited to this structure, and, for example, it is possible that the inner wall of the vessel 11 is so structured as to reach the vicinity of the end surface of the non-linear optical crystal 2, and the gas 16 is supplied directly to the vicinity of the end surface of the non-linear optical crystal 2 from the holes 13b and 13e without using the piping 15g, and the same advantages as those in the above-mentioned seventh embodiment are obtained.

Eighth Embodiment

Figure 10:
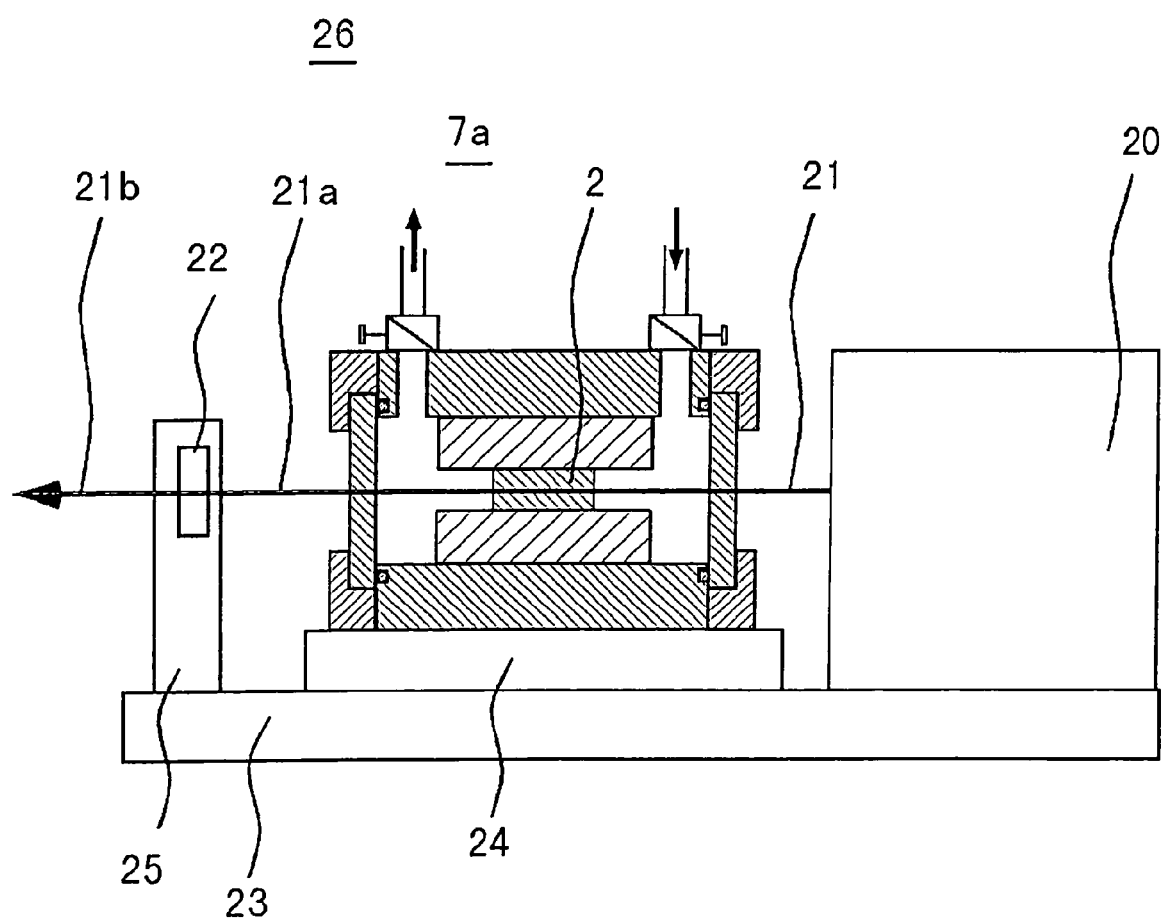
FIG. 10 is a longitudinally cross-sectional view showing a wavelength conversion laser device in accordance with an eighth embodiment of the present invention.

FIG. 10 is a diagram for explanation of a wavelength conversion laser device in accordance with an eighth embodiment for implementing the present invention, and more particularly, FIG. 10 is a longitudinally cross-sectional view of the wavelength conversion laser device.

In FIG. 10, reference numeral 2 denotes a non-linear optical crystal; 7a is a wavelength converting device as described in the above-mentioned first embodiment; 20 is a laser device that generates a laser beam which is 532 nm in wavelength and a second higher harmonic wave of a neodymium/YAG (Nd:YAG) laser; 21 is a laser beam which is 532 nm in wavelength and outputted from the laser device 20; and 21a is a laser beam obtained by causing a part of the laser beam 21 which is 532 nm in wavelength to be wavelength-converted into a wavelength of 266 nm by the non-linear optical crystal 2. Reference numeral 22 denotes a wavelength selection mirror through which the laser beam which is 266 nm in wavelength is transmitted and which is subjected to a coating that reflects the laser beam which is 532 nm in wavelength. Reference symbol 21b denotes an ultraviolet laser beam which is 266 nm in wavelength; 23 is a base; and 24 is a support for fixing the wavelength converting device 7a onto the base 23. Reference numeral 25 denotes a fixing jig for fixing the wavelength selection mirror 22 onto the base 23; and 26 shows the entire wavelength conversion laser device.

The non-linear optical crystal 2 is made of, for example, a cesium/lithium/borate (chemical expression: $CsLiB_6O_{10}$, abbreviated name: CLBO) crystal, a cesium/borate (chemical expression: $CsB_3O_5$, abbreviated name: CBO) crystal, a lithium/borate (chemical expression: $LiB_3O_5$, abbreviated name: LBO) crystal, beta/barium/borate (chemical expression: $\beta$-$BaB_2O_4$, abbreviated name: BBO) crystal, or gadolinium/yttrium/calcium/oxyborate (chemical expression: $Gd_xY_{1-x}Ca_4(BO_3)_3$, abbreviated name: GdYCOB) crystal. The non-linear optical crystal 2 has both end surfaces cut and polished at a phase matching angle for generating an ultraviolet laser beam which is 400 nm or shorter in wavelength due to wavelength conversion, and is fixed on the vessel 11 by the fixing fittings 17a and 17b. In this example, the non-linear optical crystal 2 is made of a CLBO crystal, and both end surfaces of the non-linear optical crystal 2 are cut and polished at a type 1 phase matching angle for converting the laser beam which is 532 nm in wavelength into the ultraviolet laser beam which is 266 nm in wavelength.

The laser beam 21 which is 532 nm in wavelength and outputted from the laser device 20 enters the wavelength converting device 7a and a part of the laser beam 21 is wavelength-converted into a wavelength of 266 nm by the non-linear optical crystal 2 to provide a laser beam 21a. Only the 266 nm-wavelength component of the laser beam 21a is transmitted through the wavelength selection mirror 22, and the 532 nm-wavelength component is reflected into the ultraviolet laser beam 21b which is 266 nm in wavelength.

In the eighth embodiment, the wavelength conversion laser device is structured as described above, and the non-linear optical crystal 2 is exposed to the gas that does not contain nitrogen elements or contains a small amount of nitrogen elements. As a result, because no nitric acid compound such as cesium nitrate is generated even if the ultraviolet laser beam which is 400 nm or shorter in wavelength is applied to the non-linear optical crystal by the wavelength conversion, there can be obtained such an advantage that the wavelength conversion laser beam can be generated which is high in quality and high in output stably for a long period. Also, since it is unnecessary that the wavelength converting device 7a is formed of the vacuum vessel, there is obtained such advantages that no impurities occur from the vessel and the wavelength conversion laser device can be also provided inexpensively.

In the above-mentioned eighth embodiment, the use of the wavelength converting device 7a as described in the first embodiment is exemplified, but any wavelength converting devices 7b to 7g described in the second to seventh embodiments may be employed, and the same advantages as those in the above-mentioned eighth embodiment can be obtained.

Also, in the above-mentioned eighth embodiment, there is described an example in which the laser device 20 that generates a laser beam which is 532 nm in wavelength and a second higher harmonic wave of a neodymium/YAG (Nd:YAG, chemical expression Nd: $Y_3Al_5O_{12}$) laser is employed as a light source. However, the wavelength of the light source is not limited to this, and the fundamental wave or the second higher harmonic wave of, for example, ytterbium/YAG (Yb: YAG, chemical expression Yb: $Y_3Al_5O_{12}$), neodymium/YLF (Nd:YLF, chemical expression Nd:$LiYF_4$), neodymium/$YVO_4$ (Nd:$YVO_4$) and titanium/sapphire (Ti:$Al_2O_3$) may be applied, and the same advantages as those in the above-mentioned eighth embodiment are obtained.

Ninth Embodiment

Figure 11:
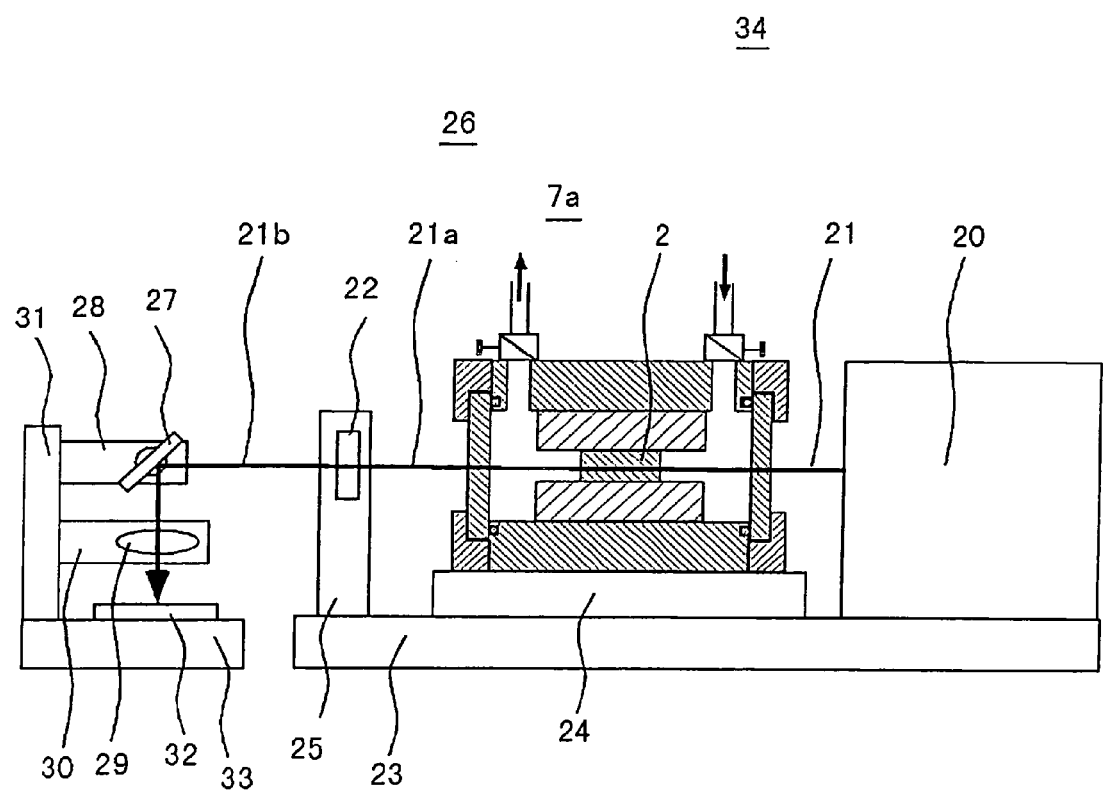
FIG. 11 is a longitudinally cross-sectional view showing a laser machining device in accordance with a ninth embodiment of the present invention.
Figure 12:
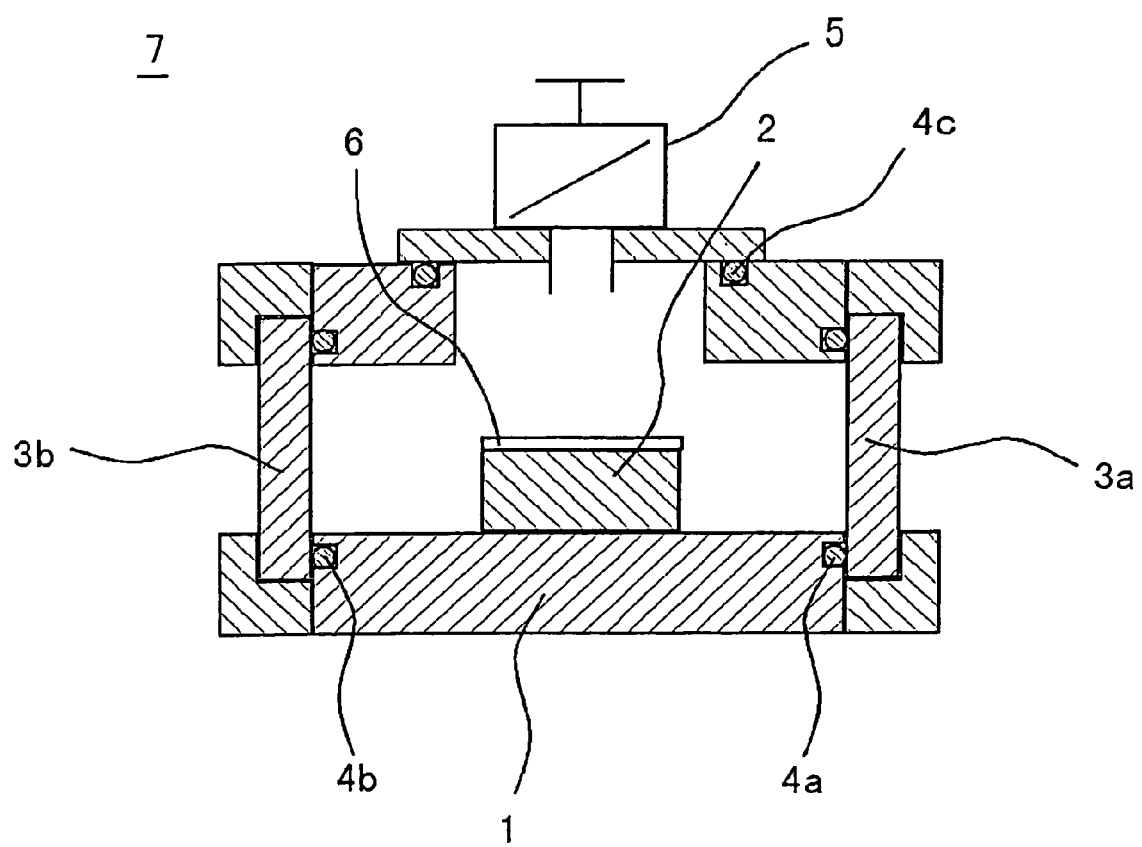
FIG. 12 is a longitudinally cross-sectional view showing a conventional wavelength converting device.

FIG. 11 is a diagram for explanation of a laser machining device in accordance with a ninth embodiment for implementing the present invention, and more particularly, FIG. 11 is a longitudinally cross-sectional view of the laser machining device.

In FIG. 11, reference numeral 26 denotes a wavelength conversion laser device described in the eighth embodiment. Reference numeral 27 denotes a galvano mirror; 28 is a galvano mirror fixing jig that fixes the galvano mirror 27 with setting variably an angle with respect to the ultraviolet laser beam 21b which is 266 nm in wavelength and outputted from the wavelength conversion laser device 26; 29 is an fθ lens; and 30 is an fθ lens fixing jig. Reference numeral 31 is a mirror lens fixing jig; 32 is a processing such as a printed board or green sheet, which is a glass epoxy printed board in this example; 33 is a machining device base; and 34 is a machining device which is made up of the galvano mirror 27, the galvano mirror fixing jig 28, the fθ lens 29, the fθ lens fixing jig 30, the mirror lens fixing jig 31 and the machining device base 33.

The galvano mirror 27 is fixed to the mirror lens fixing jig 31 by the galvano mirror fixing jig 28 and fixed on the machining device base 33. The fθ lens 29 is fixed onto the mirror lens fixing jig 31 by the fθ lens fixing jig 30 and fixed onto the machining device base 33.

The wavelength conversion laser beam 21b which is emitted from the wavelength conversion laser device 26 is inputted to the galvano mirror 27, and its travelling direction is variably changed by the galvano mirror 27. The wavelength conversion laser beam 21b the travelling direction of which has been changed is inputted to the fθ lens 29 and converged on the processing 32. The converged wavelength conversion laser beam 21b pierces the processing 32.

In the ninth embodiment, because the laser machining device is structured as described above and the wavelength conversion laser device 26 can generate the wavelength conversion laser beam 21b stably for a long period, there is obtained such an advantage that uniform machining can be conducted stably for a long period and with a high precision, and there is provided a method of manufacturing a printed board which is excellent in quality. Also, since it is unnecessary that the wavelength converting device 7a is formed of the vacuum vessel, there is obtained such an advantage that the laser machining device can be provided inexpensively.

Note that, FIG. 11 shows an example that the travelling direction of the wavelength conversion laser beam 21b is variably changed by the provision of the galvano mirror 27, but a movable table that moves the processing 32 such as an XY stage may be disposed on the base 33, and both of the galvano mirror 27 and the movable table may be disposed.

Also, FIG. 11 shows the provision of the fθ lens 29, but a flat convex lens or a biconvex lens may be disposed instead.

In the above-mentioned ninth embodiment, there is described an example of machining in which the processing 32 such as the glass epoxy printed wiring board is pierced, but the processing 32 is not limited to the specific processing if it is a processing to be machined such as the printed wiring board made of another material, a green sheet, an electronic part, a metal, or glass, and machining is applicable to any machining such as cutting, welding, diesinking, marking, forming or the like, and the same advantages as those in the above-mentioned ninth embodiment are obtained.

For example, in the case where a fiber grating preparing machining is conducted which changes the periodic refractive factor of the optical fiber with the processing 32 as the optical fiber, because the wavelength conversion laser device 26 can generate the wavelength conversion laser beam 21b which is high in quality without any strain stably for a long period, there is obtained such an advantage that the uniform machining can be conducted stably for a long period of time and with a high precision, and there can be provided a method of manufacturing a fiber grating which is excellent in quality.

INDUSTRIAL APPLICABILITY

The wavelength converting method and the wavelength converting device according to the present invention can be employed in, for example, the wavelength conversion laser device, and also a laser machining device can be structured by using the wavelength conversion laser device. Since the laser machining device of this type can conduct the uniform machining stably for a long period and with a high precision, the laser machining device can be used advantageously in various machinings such as the manufacturing of a printed wiring board or the manufacturing of a fiber grating.

The invention claimed is:

1. A wavelength converting method comprising passing light of a first wavelength through a non-linear optical crystal and outputting the light from an output surface of the non-linear crystal at a second wavelength, different from the first wavelength, the output surface being in contact with a gaseous ambient containing less nitrogen than air, the gaseous ambient excluding an ambient consisting of oxygen, ambients consisting of one or more rare gases, and ambients consisting of oxygen and at least one rare gas.

2. The wavelength converting method according to claim 1, wherein an incident surface of the non-linear optical crystal on which the light to be wavelength-converted is incident and the output surface of the non-linear optical crystal are in a gaseous ambient that contains less nitrogen than air, the gaseous ambient excluding an ambient consisting of oxygen, ambients consisting of one or more rare gases, and ambients consisting of oxygen and at least one rare gas.

3. The wavelength converting method according to claim 1, wherein respective ambients that are in contact with an incident surface of the non-linear optical crystal on which the light to be wavelength-converted is incident and the output surface are different.

4. The wavelength converting method according to claim 3, wherein the gaseous ambient in contact with the output surface of the non-linear optical crystal is a mixture mainly containing argon.

5. The wavelength converting method according to claim 1, including circulating the gaseous ambient in contact with the output surface of the non-linear optical crystal.

6. The wavelength converting method according to claim 5, including, after the gaseous ambient in contact with the output surface of the non-linear optical crystal is supplied to the output surface of the non-linear optical crystal, exhausting the gaseous ambient.

7. The wavelength converting method according to claim 1, wherein the gaseous ambient in contact with the output surface of the non-linear optical crystal contains no more than 10% by volume of nitrogen.

8. The wavelength converting method according to claim 1, wherein the non-linear optical crystal is a crystal including cesium.

9. The wavelength converting method according to claim 1, wherein the gaseous ambient in contact with the output surface of the non-linear crystal mainly contains carbon dioxide.

10. A wavelength converting device that wavelength-converts light passed through a non-linear optical crystal comprising means for controlling a gaseous ambient in contact with an output surface of the non-linear optical crystal from which the light that has been wavelength-converted is output so the gaseous ambient contains less nitrogen than air, the gaseous ambient excluding an ambient consisting of oxygen, ambients consisting of one or more rare gases, and ambients consisting of oxygen and at least one rare gas.

11. The wavelength converting device according to claim 10, wherein the wavelength-converted light output is at least 5 W in mean power.

12. The wavelength converting device according to claim 10, further comprising means for surrounding an incident surface of the non-linear optical crystal on which the light to be wavelength-converted is incident and the output surface of the non-linear optical crystal with a gaseous ambient that is lower in nitrogen than air, the gaseous ambient excluding an ambient consisting of oxygen, ambients consisting of one or more rare gases, and ambients consisting of oxygen and at least one rare gas.

13. The wavelength converting device according to claim 10, further comprising means for controlling respective gaseous ambients in contact with an incident surface of the non-linear optical crystal on which the light to be wavelength-converted gaseous ambients are different.

14. The wavelength converting device according to claim 13, wherein the gaseous ambient in contact with the output surface of the non-linear optical crystal is a mixture mainly containing argon.

15. The wavelength converting device according to claim 10, comprising means for circulating the gaseous ambient in contact with the output surface of the non-linear crystal.

16. The wavelength converting device according to claim 15, wherein the non-linear optical crystal is disposed within a vessel including a window or an opening that allows incident light or outgoing light to pass and means for supplying a gaseous ambient lower in content of nitrogen than air, the gaseous ambient excluding an ambient consisting of oxygen, ambients consisting of one or more rare gases, and ambients consisting of oxygen and at least one rare gas, to the vicinity of at least the output surface of the non-linear optical crystal within said vessel, and means for exhausting the gaseous ambient from said vessel.

17. The wavelength converting device according to claim 10, wherein the gaseous ambient in contact with the output surface of the non-linear crystal contains no more than 10% by volume of nitrogen.

18. The wavelength converting device according to claim 10, wherein the non-linear optical crystal is a crystal including cesium.

19. The wavelength converting device according to claim 10, wherein the gaseous ambient in contact with the output surface of the non-linear crystal is mainly carbon dioxide.

20. A laser machining device comprising:

a machining device;

a laser device, which is a light source for wavelength conversion, as a machining light source;

a wavelength-converting device that wavelength-converts the light from said laser device by passing the light through a non-linear optical crystal; and means for controlling a gaseous ambient in contact with a surface of the non-linear optical crystal from which wavelength-converted light is outputted, so the gaseous ambient contains less nitrogen than air, the gaseous ambient excluding an ambient consisting of oxygen, ambients consisting of one or more rare gases, and ambients consisting of oxygen and at least one rare gas.

* * * * *